United States Patent
Harano et al.

(10) Patent No.: US 11,192,741 B2
(45) Date of Patent: Dec. 7, 2021

(54) IMAGE FORMING APPARATUS, IMAGE FORMING SYSTEM AND CONTROL METHOD THEREFOR

(71) Applicant: CANON KABUSHIKI KAISHA, Tokyo (JP)

(72) Inventors: Yuzo Harano, Sagamihara (JP); Hideaki Ooba, Yokohama (JP); Aya Ito, Tokyo (JP); Junichi Yamakawa, Kashiwa (JP); Yusuke Kimura, Abiko (JP); Nobuhiro Kawamura, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 16/158,491

(22) Filed: Oct. 12, 2018

(65) Prior Publication Data

US 2019/0112140 A1 Apr. 18, 2019

(30) Foreign Application Priority Data

Oct. 18, 2017 (JP) .............................. JP2017-201539

(51) Int. Cl.
*B65H 7/04* (2006.01)
*B65H 43/02* (2006.01)
(Continued)

(52) U.S. Cl.
CPC .............. *B65H 7/04* (2013.01); *B65H 43/02* (2013.01); *G06F 3/04817* (2013.01);
(Continued)

(58) Field of Classification Search
CPC ...... B65H 7/04; B65H 43/02; B65H 2220/01; B65H 2220/03; B65H 2511/518;
(Continued)

(56) References Cited

U.S. PATENT DOCUMENTS 7,646,999 B2 * 1/2010 Tanaka ............... G03G 15/6508
399/82
2007/0071477 A1 * 3/2007 Tanaka ............... G03G 15/6508
399/82

(Continued)

FOREIGN PATENT DOCUMENTS

JP 2003-330644 A 11/2003

OTHER PUBLICATIONS

Great Britain Search and Examination Report dated Apr. 10, 2019, in Great Britain Application No. 1816458.2.

*Primary Examiner* — Thomas A Morrison
(74) *Attorney, Agent, or Firm* — Venable LLP

(57) ABSTRACT

An image forming system displays warning information representing a state of no printing sheet detected in a first sheet holding unit, and displays information representing a normal state of no sheet printing sheet detected in the second sheet holding unit. In a case where a transition occurs from a state where at least one printing sheet is in the second sheet holding unit to a state where there are no sheets in the second sheet holding unit while the image forming apparatus performs printing using the printing sheets held in the second sheet holding unit, displaying warning information representing a state of no printing sheet in the second sheet holding unit and changes to information representing a normal state in the second sheet holding unit if a predetermined period has passed.

13 Claims, 19 Drawing Sheets

(51) Int. Cl.
     *G06K 15/16*     (2006.01)
     *G06K 15/00*     (2006.01)
     *G06F 3/0481*     (2013.01)

(52) U.S. Cl.
     CPC ......... *G06K 15/002* (2013.01); *G06K 15/005* (2013.01); *G06K 15/16* (2013.01); *G06K 15/4065* (2013.01); *B65H 2220/01* (2013.01); *B65H 2220/03* (2013.01); *B65H 2511/518* (2013.01); *B65H 2551/21* (2013.01)

(58) Field of Classification Search
     CPC ............ B65H 2551/21; G06F 3/04817; G06K 15/002; G06K 15/005; G06K 15/16; G06K 15/4065
     See application file for complete search history.

(56) References Cited

U.S. PATENT DOCUMENTS

| | | |
|---|---|---|
| 2009/0261524 A1 | 10/2009 | Nakayama et al. |
| 2017/0087883 A1 | 3/2017 | Matsui |
| 2019/0037096 A1* | 1/2019 | Tanaka ............... H04N 1/00665 |

* cited by examiner

IMAGE FORMING APPARATUS, IMAGE FORMING SYSTEM AND CONTROL METHOD THEREFOR

BACKGROUND OF THE INVENTION

Field of the Invention

The present invention relates to a printing system for managing sheet information that is used when printing, a method for controlling the printing system, and a program thereof.

Description of the Related Art

Conventionally, a printing apparatus included in a printing system has various kinds of sheet feeding devices in which printing sheets are loaded and which supply printing sheets to the printing apparatus. Examples of such sheet feeding devices include deck-type sheet feeding devices that are housed like a chest of drawers inside the printing apparatus, and manual feed tray-type sheet feeding devices that are not housed inside the printing apparatus. Unlike a deck-type sheet feeding device in which specific printing sheets are always loaded in advance, a manual feed tray-type sheet feeding device is a type of sheet feeding device that is used each time a user of the printing apparatus places printing sheets that correspond to the kind of printing sheets the user wishes to use for printing in the manual feed tray-type sheet feeding device.

A method is known that, when printing sheets have not been placed in such sheet feeding devices, prompts the user to reload printing sheets by displaying a warning to the effect that there are no sheets in the relevant sheet feeding device on the printing apparatus by means of a GUI (graphical user interface) or a character string (Japanese Patent Application Laid-Open No. 2003-330644). For example, according to the aforementioned method, if there are no printing sheets in a given sheet feeding device, in a case where a GUI display is adopted, a warning is displayed by showing an icon in red that visually conveys a message to the effect that there are no printing sheets in the sheet feeding device, while in a case where a character string is adopted, a warning is displayed by means of a character string such as "There are no printing sheets".

In this connection, in some cases the point of view regarding what a "normal state" is as well as the definition of a "normal state" differ for different types of sheet feeding devices. For example, in the case of a deck-type sheet feeding device, from the viewpoint of the user of the printing apparatus, a state in which printing sheets are present in the sheet feeding device is a "normal state", while on the other hand, in the case of a sheet feeding device of a manual feed tray type, a state in which printing sheets are not present in the sheet feeding device is a "normal state".

If the conventional technology is applied to a printing apparatus having a mixture of sheet feeding devices with respect to which the point of view regarding what constitutes a "normal state" as well as the definition of a "normal state" differ, a warning to the effect that there are no sheets in the sheet feeding devices will be displayed in a uniform manner, and in some cases this will be an inappropriate warning display for the user of the printing apparatus. That is, even though a state in which there are no sheets in a sheet feeding device such as a manual feed tray for which a state in which there are no printing sheets therein is a "normal state" is, from the viewpoint of the user of the printing apparatus, an "expected state", a warning display is presented.

SUMMARY OF THE INVENTION

The present invention is characterized by an image forming apparatus which includes an image forming unit and a print control unit configured to perform control of the image forming unit, wherein: the image forming unit comprises a first sheet feeding unit configured to be able to store printing sheets, a second sheet feeding unit of a manual feed type configured to load printing sheets thereon, a detection unit configured to detect a sheet quantity of the printing sheets stored in the sheet feeding units, and a display unit configured to display a state of the image forming unit; in a case where a state in which there are no sheets in the first sheet feeding unit is detected, the image forming apparatus displays a state of no printing sheet with a display object indicating a warning; and in a case where a state in which there are no sheets in the second sheet feeding unit is detected, the image forming apparatus presents a display of a state of no printing sheet with a display object indicating a normal state.

According to the present invention, even in the case of a printing apparatus which includes a mixture of sheet feeding devices for which points of view regarding a normal state are different, that is, for which the point of view regarding what constitutes a "normal state" and the definition of a "normal state" are different, the printing system enables appropriate warning displays in relation to the presence or absence of printing sheets in the respective sheet feeding devices.

Further features of the present invention will become apparent from the following description of exemplary embodiments with reference to the attached drawings.

DESCRIPTION OF THE EMBODIMENTS

Figure 1:
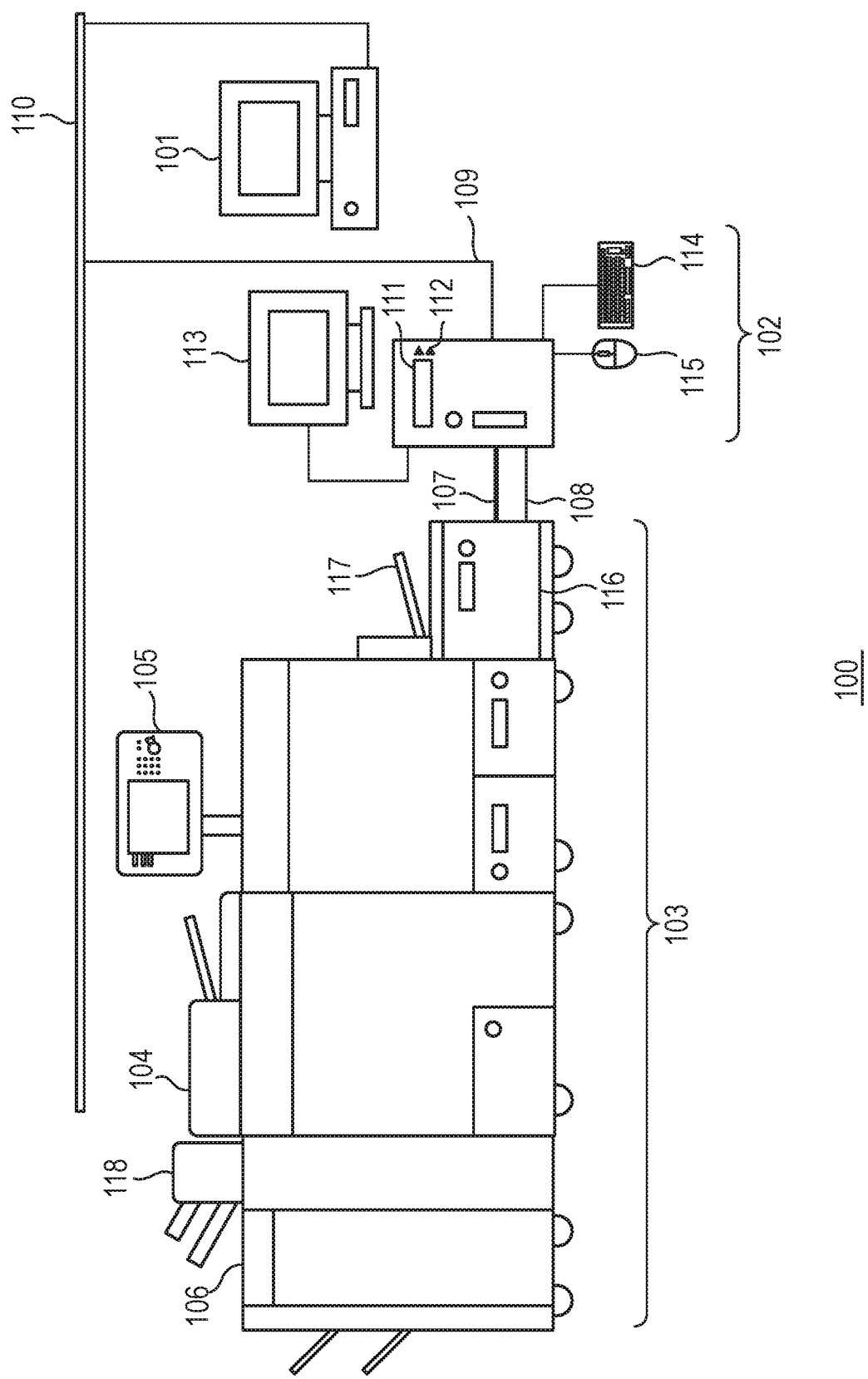
FIG. 1 is a block diagram illustrating the overall configuration of a printing system to which the present invention is applied.

Preferred embodiments of the present invention will now be described in detail in accordance with the accompanying drawings.

Hereunder, modes for carrying out the present invention are described using the accompanying drawings. Note that, descriptions of elements that are not required for describing the present invention may be omitted from the following description.

Embodiment 1

Hereunder, Embodiment 1 of the present invention is described in detail referring to the drawings.

<Overall Configuration of Image Forming System 100>

FIG. 1 is a block diagram illustrating the overall configuration of an image forming system 100. The image forming system 100 illustrated in FIG. 1 includes an image forming apparatus 103 and a print control apparatus 102. The image forming system 100 is communicably connected to a client computer 101. The client computer 101 is communicably connected through a local area network (LAN) 110 to the print control apparatus 102.

The print control apparatus 102 and the image forming apparatus 103 are connected through an image/video cable 107 and a control cable 108. In the present embodiment, the image forming apparatus 103 communicates through the print control apparatus 102, and is not directly connected to the LAN 110. Note that the image forming apparatus 103 may be directly connected to the LAN 110 and configured to be capable of communicating with the client computer 101.

The client computer 101 activates an application and issues printing instructions or the like to the image forming system 100.

The print control apparatus 102 performs image processing in cooperation with the image forming apparatus 103.

The image forming apparatus 103 is a multifunction peripheral equipped with various functions, and is capable of not only performing processing on images from the client computer 101 and the print control apparatus 102, but also of copying data that was read by a scanner unit 104, and transmitting the data to a shared folder. When scanning an image using the scanner unit 104, the image forming apparatus 103 accepts various instructions from a user through various keys on an operation unit 105.

The operation unit 105 displays various kinds of information, such as a scanning state, through a panel. A post-processing apparatus 106 receives a sheet on which an image has been formed, and performs post-processing on the sheet and thereafter discharges the sheet.

As sheet feeding devices, the image forming apparatus 103 has internal paper decks, and also has a paper deck 116 that can store long sheets as an option, a manual feed tray 117 and an inserter 118. A sensor that can detect the presence or absence of sheets as well as the quantity of sheets and the like is provided in these sheet feeding devices.

The print control apparatus 102 includes a display unit 111. The display unit 111 displays information relating to the print control apparatus 102. Buttons included in an operation button unit 112 which are hardware buttons can be operated to perform an operation with respect to information displayed on the display unit 111. Information displayed on the display unit 111 is used to show the minimum information (a power supply operation or an IP address confirmation) required to operate the print control apparatus 102.

An external display apparatus 113 such as a liquid crystal monitor, a keyboard 114 and a pointing device 115 are connected to the print control apparatus 102 to thereby enable performance of an operation for issuing an instruction or the like to the print control apparatus 102. Although in Embodiment 1 the image forming system 100 is described as including the print control apparatus 102 and the image forming apparatus 103 as separate systems, the functions of the print control apparatus 102 may be included within the image forming apparatus 103, and the print control apparatus 102 need not be physically provided as a separate body. Further, a configuration may also be adopted in which the display apparatus 113 has a function of a position inputting device such as a touch pad, and also provides the function of the pointing device 115.

<Configuration of Image Forming Apparatus 103>

Figure 2:
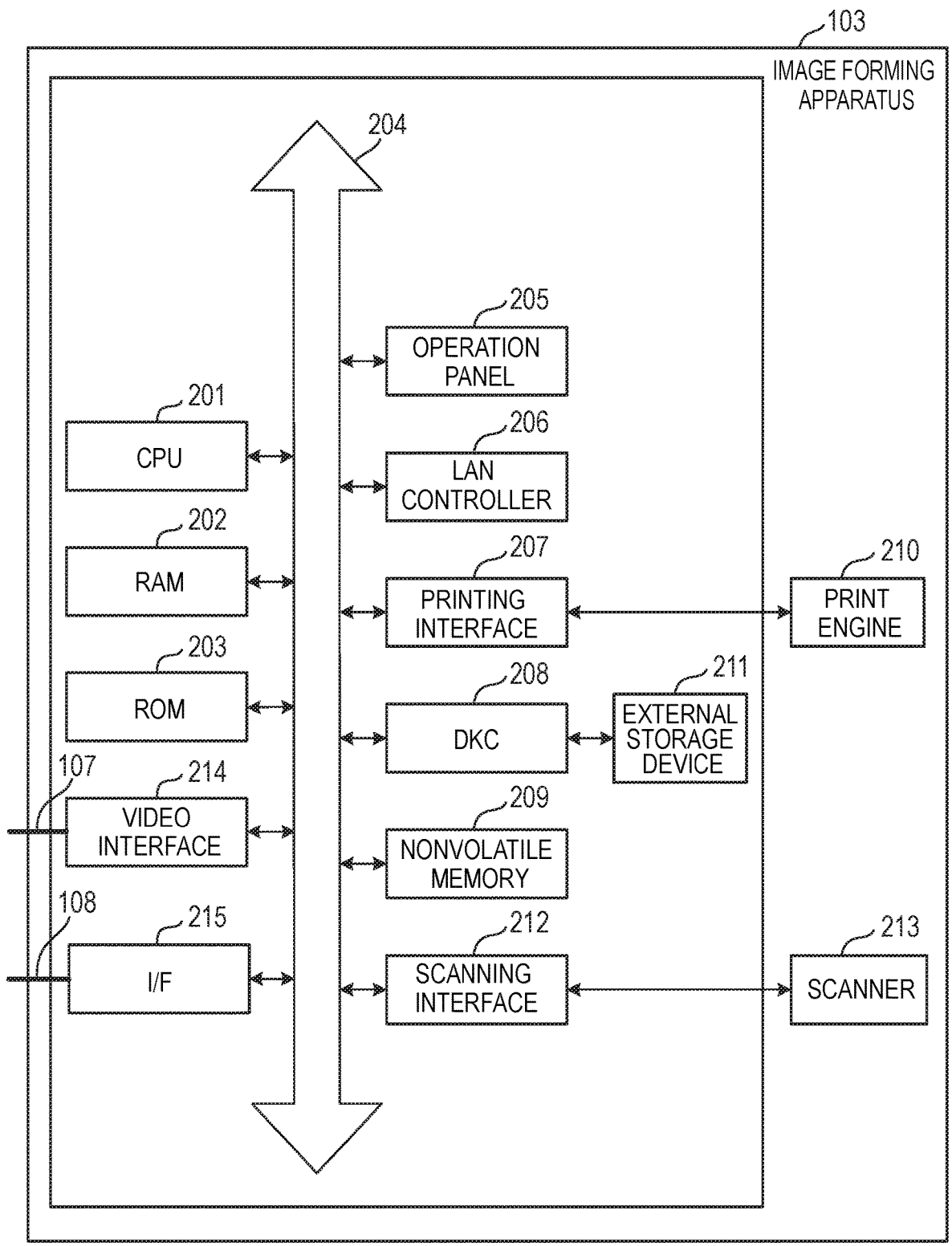
FIG. 2 is a block diagram illustrating the hardware configuration of an image forming apparatus.

FIG. 2 is a block diagram illustrating the hardware configuration of the image forming apparatus 103.

A CPU 201 performs overall control of access to various devices that are connected to a system bus 204 based on a control program stored on a ROM 203 or an external storage device 211. The CPU 201 also outputs image signals as output information to a printing unit (printer engine 210) that is connected through a printing interface 207, and controls image signals that are input from a scanner unit (scanner 213) that is connected through a scanning interface 212.

The CPU 201 is capable of performing processing to communicate with the print control apparatus 102 through a LAN controller 206.

A RAM 202 mainly functions as the main memory or work area or the like of the CPU 201. Access to the external storage device 211 such as a hard disk (HDD) or an IC card is controlled by a disk controller (DKC) 208. The hard disk is used as an area for storing an application program, font data, form data and the like, or as an area for spooling a print job temporarily and that stores the job for externally controlling the spooled job.

The external storage device 211 is further used as a BOX data storage area for holding image data that was read from the scanner 213 or image data of a print job as BOX data, referring to the image data from a network, and performing printing. In the present embodiment, hereinafter it is assumed that an HDD is used as the external storage device, and the HDD holds various logs such as a job log and an image log.

The operation panel 205 allows a user to input various kinds of information by means of software keys or hardware keys.

A nonvolatile memory 209 stores various kinds of settings information that is set using the operation panel 205 or using a terminal via a network. A video interface 214 receives image data through the video cable 107 from the print control apparatus 102. An I/F 215 receives control data from the print control apparatus 102 through the control cable 108.

<Configuration of Print Control Apparatus 102>

Figure 3:
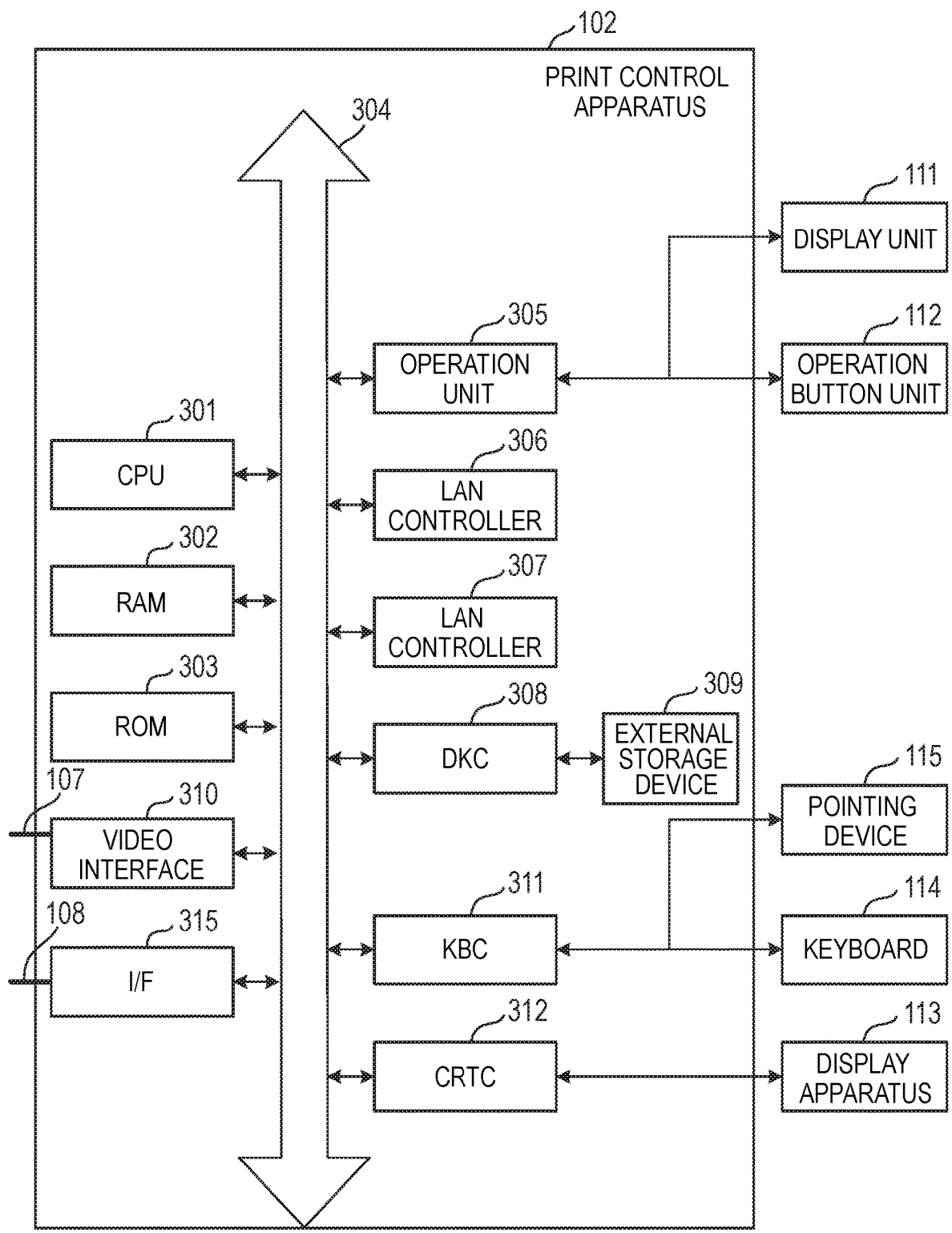
FIG. 3 is a block diagram illustrating the hardware configuration of a print control apparatus.

FIG. 3 is a block diagram illustrating the hardware configuration of the print control apparatus 102.

A CPU 301 performs overall control of access to various devices that are connected to a system bus 304 based on a control program stored on a ROM 303 or an HDD 309. The CPU 301 is also capable of performing processing to communicate with the image forming apparatus 103 through a LAN controller A 306. Further, the CPU 301 is capable of performing processing to communicate with the client computer 101 or the image forming apparatus 103 through a LAN controller B 307.

A RAM 302 mainly functions as the main memory or work area or the like of the CPU 301. Access to the HDD 309 such as a hard disk (HDD) or an IC card is controlled by a disk controller (DKC) 308. The hard disk stores an application program, font data, form data or the like, or spools a print job temporarily. The hard disk is also used as a job storage area in which a spooled job that has been processed by a RIP (raster image processor) is saved again. An operation unit 305 allows a user to input various kinds of information from the operation button unit 112, and the information can be displayed on the display unit 111.

A video interface 310 transmits image data that has undergone RIP processing to the image forming apparatus 103. A keyboard controller (KBC) 311 performs processing relating to the input of information or the like from the pointing device 115 such as the keyboard 114 or a mouse (registered trademark). A display control unit (CRTC) 312 contains a video memory therein, and renders image data into the video memory in accordance with an instruction from the CPU 301, and outputs the image data that was rendered into the video memory as a video signal to the display apparatus 113.

<Sheet Management Application (Print Control Apparatus 102)>

Next, a sheet management application that operates on the print control apparatus 102 will be described with reference to the drawings.

Figure 4A:
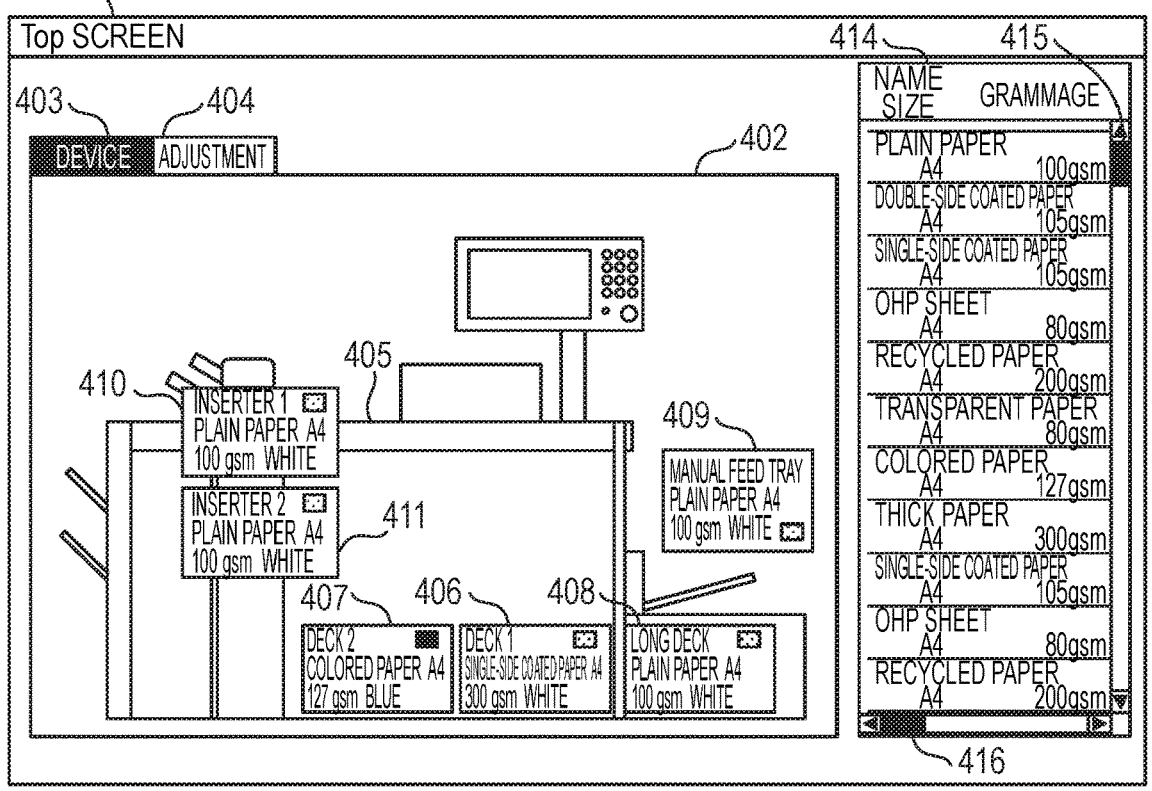
FIGS. 4A and 4B are views illustrating a top screen of a sheet management application.
Figure 4B:
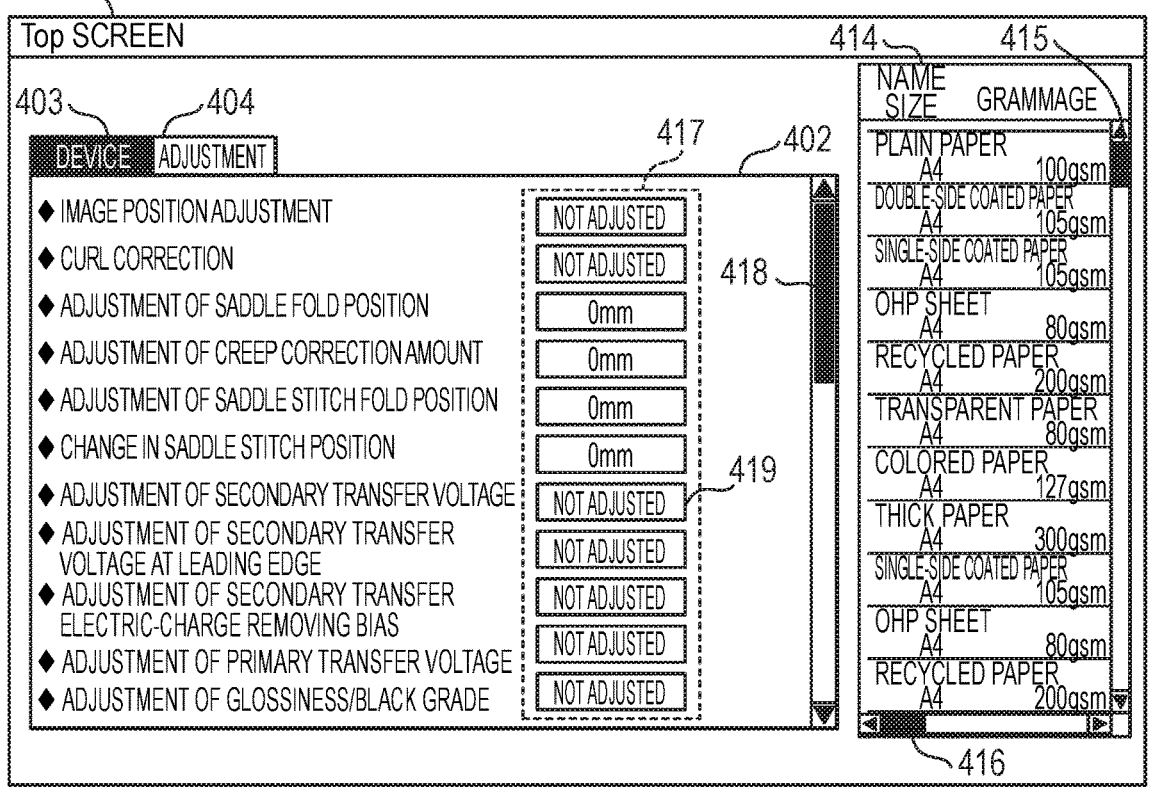

FIGS. 4A and 4B are views illustrating a top screen 401 of the print control apparatus 102. FIG. 4A illustrates the screen in a state in which information regarding sheet feed sources of the image forming apparatus 103 is displayed. FIG. 4B illustrates the screen in a state in which buttons capable of executing various adjustment settings of the image forming apparatus 103 are displayed. In accordance with an instruction from the CPU 301, the top screen 401 of the sheet management application is rendered into the video memory thereof, and the image data rendered into the video memory is output as a video signal to the display apparatus 113 and displayed thereon.

By pressing a device tab 403, a screen is displayed in a state in which sheet feed source information of the image forming apparatus 103 is displayed in a display area 402 that enables execution of tab control (FIG. 4A). Further, by pressing an adjustment tab 404, a screen is displayed in a state in which buttons that enable the execution of various adjustment settings are displayed in the display area 402 (FIG. 4B).

In the display area 402, the connection status of hardware options of the image forming apparatus 103 that are connected to the print control apparatus 102 is displayed. When the sheet management application is activated, the sheet management application acquires information regarding the hardware options of the image forming apparatus 103, and displays an image that is based on the options information.

In FIG. 4A of the present embodiment, a state is displayed in which a long deck, inserters and a finisher are connected. Sheet feed source buttons 406 to 411 are, respectively, a sheet feed source button (406) for a deck 1 and a sheet feed source button (407) for a deck 2 that are sheet feed sources, a sheet feed source button 408 for the long deck, a sheet feed source button 409 for a manual feed tray, and sheet feed source buttons 410 and 411 for inserters. The sheet management application creates and arranges the respective sheet feed source buttons 406 to 411 based on information for the sheet feed sources of the image forming apparatus 103 acquired when the sheet management application was activated.

On a display screen 414 that displays sheet information which is illustrated in FIG. 4B, the attribute information of sheets is set in columns and the sheets are set in rows, and in a case where a user wishes to display information other than the sheet attribute information that is being displayed, it is possible for the user to scroll and display the displayed columns in the row direction by operating a slider bar 416. Further, in a case where the user wishes to display information on sheets other than the sheets that are being displayed, it is possible for the user to scroll and display the displayed rows in the column direction by operating a slider bar 415.

Adjustment items that can be executed by the image forming apparatus 103 are displayed in buttons 417 with which various adjustment settings can be executed. It is possible to check adjustment setting items that are not being currently displayed by operating a slider bar 418 to scroll in the longitudinal direction.

Figure 5:
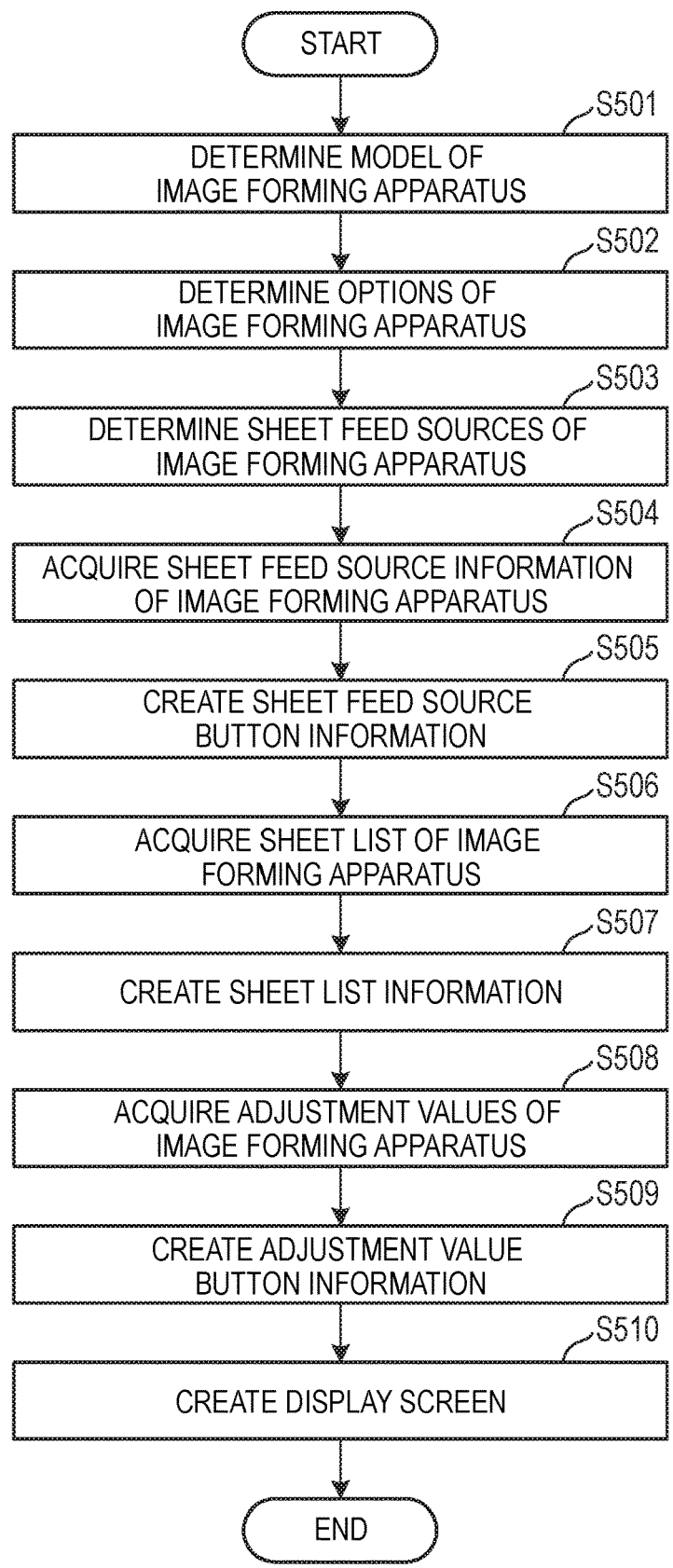
FIG. 5 is a flowchart of the sheet management application.
Figure 6:
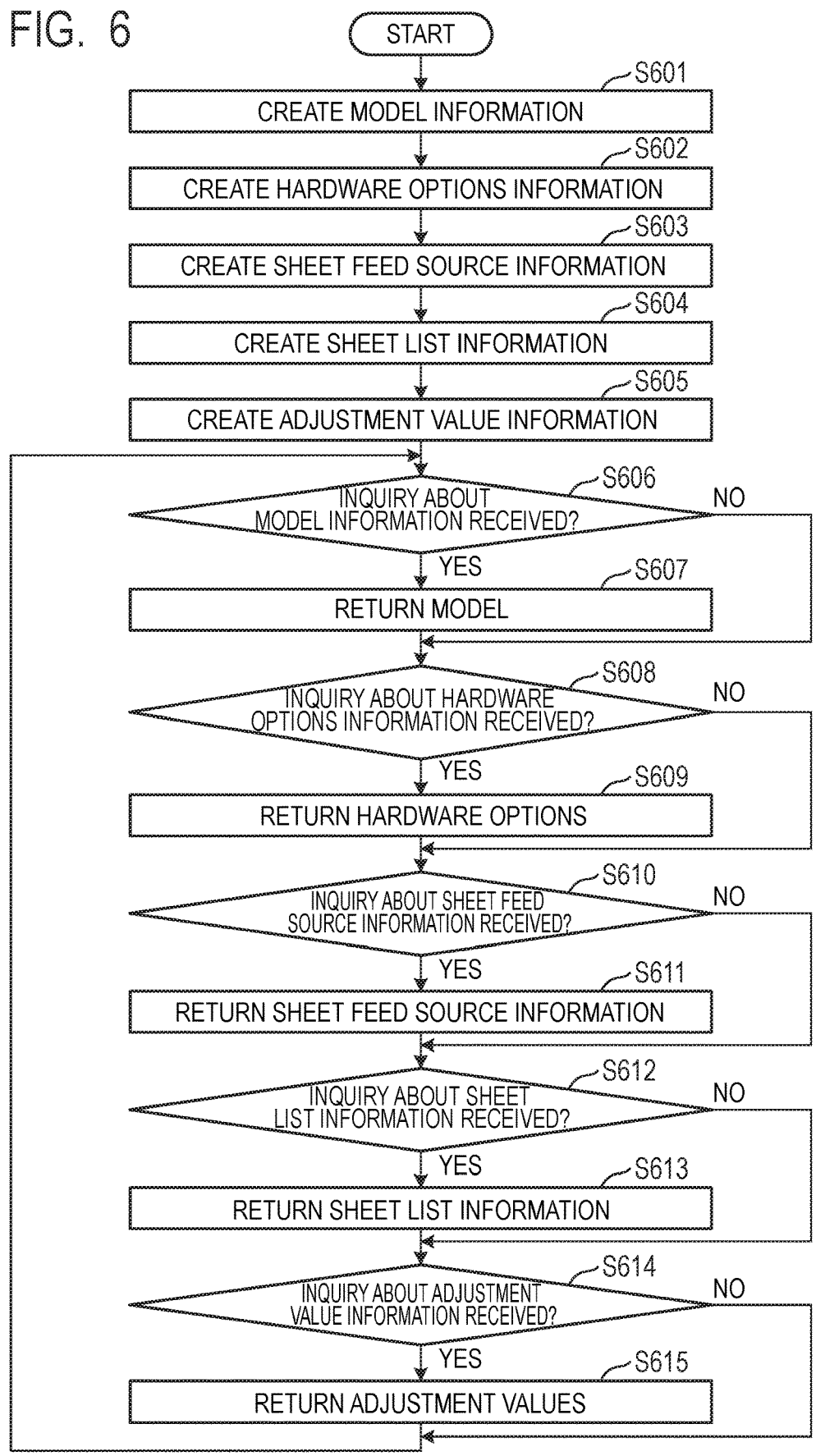
FIG. 6 is a flowchart of the image forming apparatus.

Next, processing to create the top screen 401 which is executed in the print control apparatus 102 when the sheet management application is activated will be described referring to a flowchart in FIG. 5. FIG. 6 is a flowchart of processing whereby, when the image forming apparatus 103 starts up, the image forming apparatus 103 communicates with the sheet management application of the print control apparatus 102 to create information that is synchronized between the image forming apparatus 103 and the sheet management application of the print control apparatus 102. A program of the print control apparatus 102 relating to the flowchart in FIG. 5 is stored in the HDD 309 shown in FIG. 3, and is read out to the RAM 302 and executed by the CPU 301.

<Flow of Processing at Activation of Sheet Management Application>

When the sheet management application is activated in the print control apparatus 102, first, in S501, the sheet management application determines the model of the image forming apparatus 103 that is the object of sheet management. The sheet management application determines the model of the image forming apparatus 103, and uses the determined result when creating a hardware options screen 405 and when absorbing specification differences between models. The sheet management application communicates with the image forming apparatus 103 and acquires model information based on information returned from the image forming apparatus 103 in S607 in FIG. 6 that is described later. The sheet management application also determines the model of the image forming apparatus 103 based on model information that is held in advance.

Next, in S502, the sheet management application communicates with the image forming apparatus 103 and acquires hardware options information based on information returned from the image forming apparatus 103 in S609 in FIG. 6. Based on the acquired information, the sheet management application determines the hardware options that are connected to the image forming apparatus 103. In addition, the sheet management application uses the result of the aforementioned determination when creating the hardware options screen 405, when specifying sheet feed source information, and when absorbing specification differences between models.

Next, in S503, the sheet management application acquires sheet feed source information that is returned from the image forming apparatus 103 by performing communication in S611 in FIG. 6. The sheet feed source information includes information regarding the configuration of sheet feed sources, such as optional decks, manual feed trays and long sheet trays, and information regarding the sheets that are set for the respective sheet feed sources. In addition, the sheet management application determines the sheet feed sources which are connected to the image forming apparatus 103 that is the object of the sheet management, and identifies the number of sheet feed sources that are connected.

Next, in S504, the sheet management application acquires sheet information regarding the sheets that are set for each sheet feed source based on the sheet feed source information that is already acquired.

Next, in S505, the sheet management application creates information on the sheet feed source buttons 406 to 413 displayed on the hardware options screen 405.

Subsequently, in S506, the sheet management application performs communication with the image forming apparatus 103 and acquires sheet list information that is returned in S613 in FIG. 6.

Next, in S507, the sheet management application creates information of a sheet list on the display screen 414 that displays sheet information on the hardware options screen 405. Upon creating the sheet list information in S507, the process transitions to S508.

In S508, the sheet management application performs communication with the image forming apparatus 103 and acquires adjustment values for respective adjustments based on information returned in S615 in FIG. 6 in order to use the adjustment values with adjustment buttons 417.

In S509, the sheet management application creates character strings to be set in respective buttons using the acquired adjustment values. In a case where there is only one adjustment value, that adjustment value is displayed. In a case where there are two or more adjustment values, "adjustment"/"no adjustment" is displayed.

In S510, the sheet management application creates the hardware options screen 405 based on the model (S501), hardware options information (S502), sheet feed source button information (S505), sheet list information (S507) and adjustment button information (S509) of the image forming apparatus 103.

Note that, the present processing flow has been described as operations performed when the sheet management application is activated. However, there is a possibility of the sheet feed source information, sheet list information and adjustment values of the image forming apparatus 103 being changed as needed during use of the sheet management application. Therefore, communication between the sheet management application of the print control apparatus 102 and the image forming apparatus 103 and updating of respective items of information accompanying such communication are also performed as necessary irrespective of whether such operations are performed at the print control apparatus 102 or at the image forming apparatus 103, to thereby synchronize the information between the two apparatuses.

Next, processing performed at startup of the image forming apparatus 103 through which the image forming apparatus 103 communicates with the sheet management application of the print control apparatus 102 and creates synchronized information will be described using FIG. 6.

<Processing at Startup of Image Forming Apparatus 103>

A program of the image forming apparatus 103 according to the flowchart in FIG. 6 is stored in the HDD 211 shown in FIG. 2, and is read out to the RAM 202 and executed by the CPU 201. When the image forming apparatus 103 starts up, the processing in S601 is executed.

In S601, the image forming apparatus 103 acquires its own model information from the HDD 211, and creates the acquired information as returnable data.

Next, in S602, the image forming apparatus 103 acquires, from the HDD 211, hardware options information regarding the hardware options that are connected to the image forming apparatus 103 itself, and creates the acquired information as returnable data.

In S603, the image forming apparatus 103 acquires sheet feed source information of the image forming apparatus 103 itself from the acquired hardware options information or the HDD 211, and creates the acquired information as returnable data.

In S604, the image forming apparatus 103 acquires sheet list information of the image forming apparatus 103 itself from the HDD 211, and creates the acquired information as returnable data.

In S605, the image forming apparatus 103 acquires the adjustment value information for the image forming apparatus 103 itself from the HDD 211, and creates the acquired information as returnable data. This acquisition of adjustment value information is performed for all items that are adjustable at the image forming apparatus 103.

Next, in S606, the image forming apparatus 103 determines whether an inquiry about the model information was received from the print control apparatus 102. If an inquiry about the model information has been received by means of the processing in S501 in the activation processing flow of the sheet management application, the processing transitions to S607 in which the image forming apparatus 103 returns the model information created in S601, and the processing then transitions to S608. If an inquiry about the model information is not received in S606, the processing transitions directly to S608.

In S608, the image forming apparatus 103 determines whether an inquiry about the hardware options information was received from the print control apparatus 102. If an inquiry about the hardware options information has been received by means of the processing in S502 in the activation processing flow of the sheet management application, the processing transitions to S609 in which the image forming apparatus 103 returns the hardware options information created in S602, and the processing then transitions to S610. If an inquiry about the hardware options information is not received in S608, the processing transitions directly to S610.

In S610, the image forming apparatus 103 determines whether an inquiry about the sheet feed source information was received from the print control apparatus 102. If an inquiry about the sheet feed source information has been received by means of the processing in S503 and S504 in the activation processing flow of the sheet management application, the processing transitions to S611 in which the image forming apparatus 103 returns the sheet feed source information created in S603 to the print control apparatus 102, and the processing then transitions to S612. If an inquiry about the sheet feed source information is not received in S610, the processing transitions directly to S612.

In S612, the image forming apparatus 103 determines whether an inquiry about the sheet list information was received from the print control apparatus 102. If an inquiry about the sheet list information has been received by means of the processing in S506 and S507 in the activation processing flow of the sheet management application, the processing transitions to S613. Further, the image forming apparatus 103 returns the sheet list information created in S604 to the sheet management application, and the processing then transitions to S614. The processing also transitions to S614 in a case where an inquiry about the sheet list information is not received in S612.

In S614, the image forming apparatus 103 determines whether an inquiry about the adjustment value information was received from the print control apparatus 102. If an inquiry about the adjustment value information has been received by means of the processing in S508 in the activation processing flow of the sheet management application, the image forming apparatus 103 transitions to S615 in which the image forming apparatus 103 returns the sheet feed source information created in S605 to the print control apparatus 102, and the processing then returns to the determination in S606 regarding whether or not an inquiry about the model information was received. In a case where an inquiry about the sheet feed source information is not received in S614, the processing returns directly to S606. Note that, in the present embodiment, a sheet feeding deck is one example of a sheet feeding unit, and the sheet feeding unit may be a different mechanism such as an inserter or a manual feed tray, and the form thereof is not limited.

<Sheet Settings Screen>

Next, a method of setting the sheets for each sheet feed source will be described.

Figure 7:
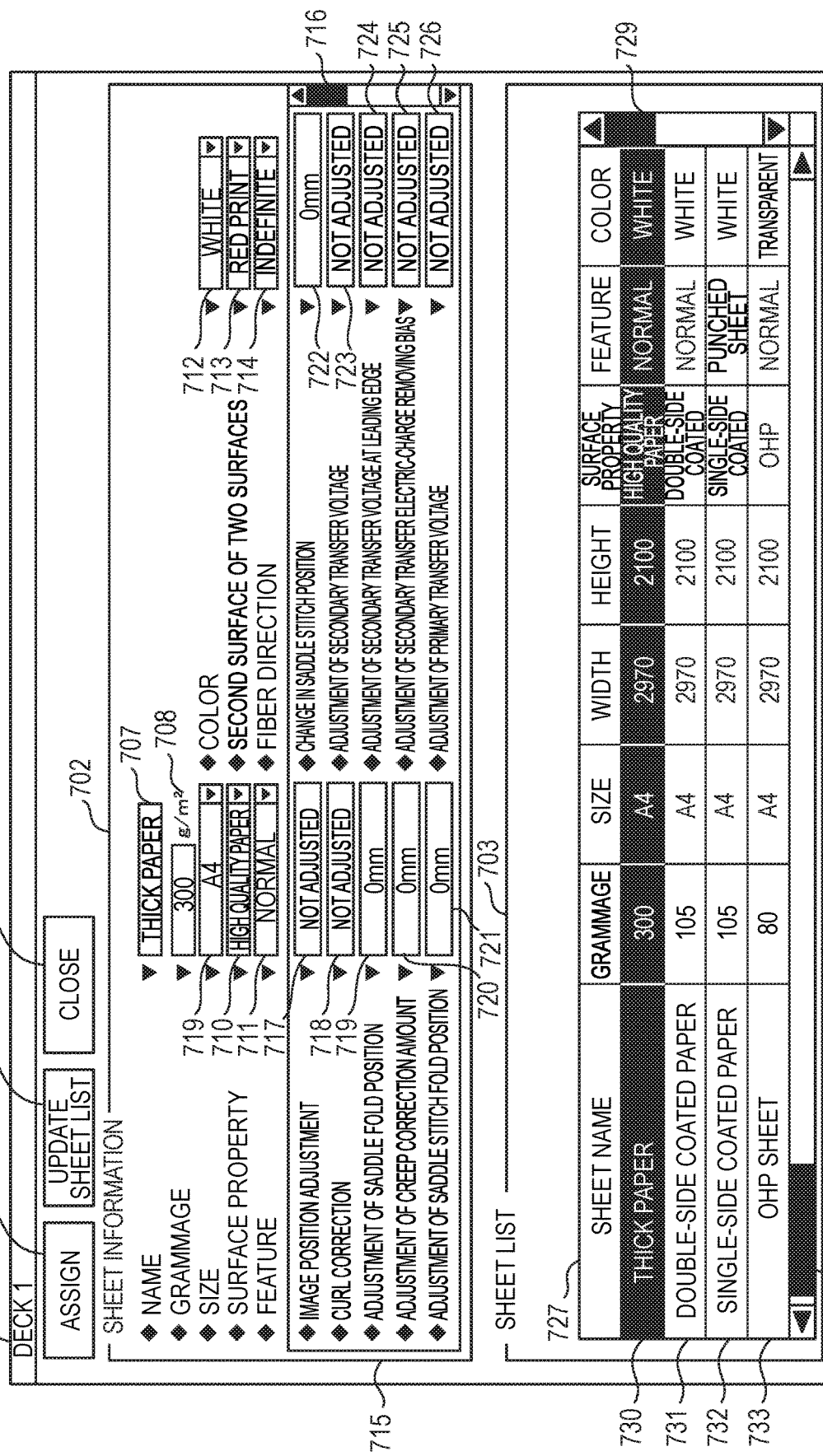
FIG. 7 is a view illustrating a setting screen for sheet feed sources of the sheet management application.

When the sheet feed source button 406 for the deck 1 in FIG. 4A is pressed using the pointing device 115 or the like, a sheet settings screen for the deck 1 that is shown in FIG. 7 is displayed. The operations for the other sheet feed source buttons 407 to 413 are the same as for the sheet feed source button 406 for the deck 1, and hence a description thereof is omitted hereunder. Further, although not described in detail, the sheet feed sources include all sheet feeding devices such as an inserter or a manual feed tray. In the following description, although the pointing device 115 or the like is used when performing an operation with respect to an application, such as pressing a button, a description regarding each of these operations is omitted.

FIG. 7 illustrates a sheet settings screen for the deck 1. In accordance with an instruction from the CPU 301, the sheet settings screen for the deck 1 is rendered into the video memory thereof, and the image data rendered into the video memory is output as a video signal to the display apparatus 113 and is displayed thereon. On a top screen 701 of a sheet feed source screen for the deck 1, a sheet information display area 702, a sheet list display area 703, an "assign" button 704, an "update sheet list" button 705, and a "close" button 706 are displayed.

The settings information for a currently selected sheet is displayed in the sheet information display area 702. When the sheet feed source button 406 shown in FIG. 4A is pressed and the top screen 701 opens, information about the sheets that are currently assigned to the deck 1 is displayed. In the sheet list display area 703, a list of the sheet information managed by the print control apparatus 102 and the image forming apparatus 103 is displayed. When the user selects a sheet from the sheet list 703, information about the selected sheet is displayed in the sheet information display area 702.

First, each input item in the sheet information display area 702 will be described. A sheet name is input into a text field 707. When changing a name, characters can be entered into the text field 707 using the keyboard 114 or the like. In the following description, a description to the effect that the keyboard 114 or the like is used when entering characters is omitted. In order to reflect the changed information in the sheet information, the "update sheet list" button 705 is pressed. By pressing the "update sheet list" button 705, the sheet information of the print control apparatus 102 and the image forming apparatus 103 can be changed.

Grammage is input into a text field 708. An operation in this case is the same as in the case of the text field 707 for the sheet name, and therefore a description thereof will be omitted. A combo box 709 displays size information for sheets. A desired size can be selected and set from the listed size information.

A combo box 710 displays surface property information. A combo box 711 displays feature information. A combo box 712 displays color information. A combo box 713 displays information regarding a second surface of two surfaces of a sheet. A combo box 714 displays fiber direction information. The operations for these boxes are the same as for the combo box 709 for the sheet size.

A display area 715 is an area in which settings relating to adjustment are displayed together. Because there is a large number of setting items that relate to adjustment, all of the setting items cannot be accommodated together in this screen. When a user wishes to check an adjustment setting item that is not currently displayed, it is possible for the user to display the setting value by operating a slider bar 716.

A setting item button 717 for image position adjustment displays whether the current sheet has already undergone image position adjustment. If the sheet has already undergone image position adjustment, "adjusted" is displayed. If the sheet has not undergone image position adjustment, "not adjusted" is displayed. An adjustment screen is opened by pressing the setting item button 717 for image position adjustment, and various adjustment values can be input on this adjustment screen. The user presses the "update sheet list" button 705 to reflect the changed information in the sheet information. When the "update sheet list" button 705 is pressed, the sheet information of the print control apparatus 102 and the image forming apparatus 103 is changed.

The operation of a setting item button 718 for curl correction that straightens curling of sheets is similar to the operation of the setting item button 717 for image position adjustment, and therefore a description thereof will be omitted. A setting item button 719 for adjustment of a saddle fold position displays a current adjustment value in mm units. An adjustment screen is opened by pressing the setting item button 719 for adjustment of the saddle fold position, and various adjustment values can be input on the adjustment screen. The "update sheet list" button 705 is pressed to reflect the changed information in the sheet information.

By pressing the "update sheet list" button 705, the sheet information of the print control apparatus 102 and the image forming apparatus 103 is changed. The operation of a setting item button 720 for adjustment of a creep correction amount, the operation of a setting item button 721 for adjustment of a saddle stitch fold position, and the operation of setting item button 722 for changing a saddle stitch position are each similar to the operation of the setting item button 719 for adjustment of the saddle fold position.

The operation of a setting item button 723 for adjustment of a secondary transfer voltage, the operation of a setting item button 724 for adjustment of a secondary transfer voltage at a leading edge, the operation of a setting item button 725 for adjustment of a secondary transfer electric-charge removing bias, and the operation of a setting item button 726 for adjustment of a primary transfer voltage are each similar to the operation of the setting item button 717 for image position adjustment.

Next, the sheet list display area 703 will be described. In a table 727 in which the sheet list is displayed, sheet attribute information is set in columns, and sheet names are set in rows. If the user wants to display sheet attribute information other than the sheet attribute information that is currently displayed, the user can display the relevant sheet attribute information by operating a slider bar 728. Further, if the user wants to display sheets other than the sheets that are currently displayed, the user can display the sheets by operating a slider bar 729. A row 730 shows the sheet that is currently being displayed in the sheet information display area 702, and the row 730 is displayed in highlighted form to indicate that the row 730 is selected.

Rows 731 to 733 show sheets that are not being displayed in the sheet information display area 702. If one of the rows 731 to 733 which are rows of unselected sheets is selected by means of the sheet list table 727, information about the selected sheet will be displayed in the sheet information display area 702. It is possible to assign the newly selected sheet to the sheet feed source 1 by pressing the "assign" button 704 in this state. If the operation is to be ended without any changes, the "close" button 706 is pressed.

<Adjustment Value Settings Screen>

Figure 8:
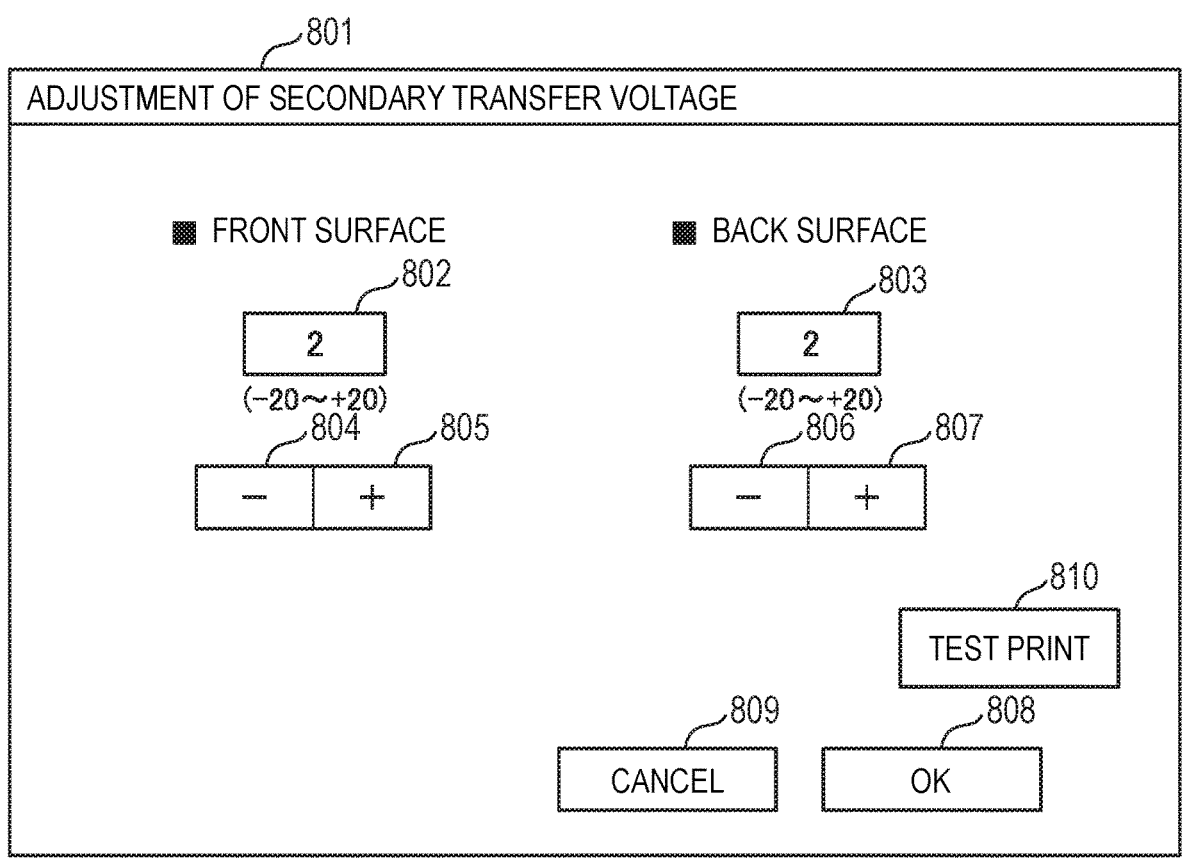
FIG. 8 is a view illustrating a screen for adjusting a secondary transfer voltage.

Next, an example of setting adjustment values will be described in a case in which the adjustment button 419 for adjustment of the secondary transfer voltage shown in FIG. 4B is used. The processing of the adjustment button 419 for adjustment of the secondary transfer voltage is the same processing as in a case where the button 723 in FIG. 7 is pressed. When a sheet is selected from the sheet list 414 and the secondary transfer voltage adjustment button 419 is pressed, a secondary transfer voltage adjustment screen 801 that is shown in FIG. 8 opens.

In accordance with an instruction from the CPU 301, the secondary transfer voltage adjustment screen 801 is rendered into the video memory thereof, and the image data rendered into the video memory is output as a video signal to the display apparatus 113 and displayed. The secondary transfer voltage adjustment screen 801 is a screen on which an adjustment value of the secondary transfer voltage can be changed. Adjustment of a voltage value when transferring toner onto the front surface of a sheet is performed by setting a value in a text box 802, and adjustment of a voltage value when transferring toner onto the back surface of a sheet is performed by setting a value in a text box 803.

It is possible to select these text boxes and input numerical values directly, and it is also possible to change the numerical values by pressing a corresponding "−" button (804 and 806) or "+" button (805 and 807). To reflect the numerical values set on this screen, the user presses an "OK" button 808. When the "OK" button 808 is pressed, the sheet management application saves the relevant setting values, and simultaneously transmits the setting values to the image forming apparatus 103 in order to change the setting values at the image forming apparatus 103, and then closes the secondary transfer voltage adjustment screen 801. Upon receiving the setting values, the image forming apparatus 103 changes the setting values of the secondary transfer voltage to the received values.

Figure 9:
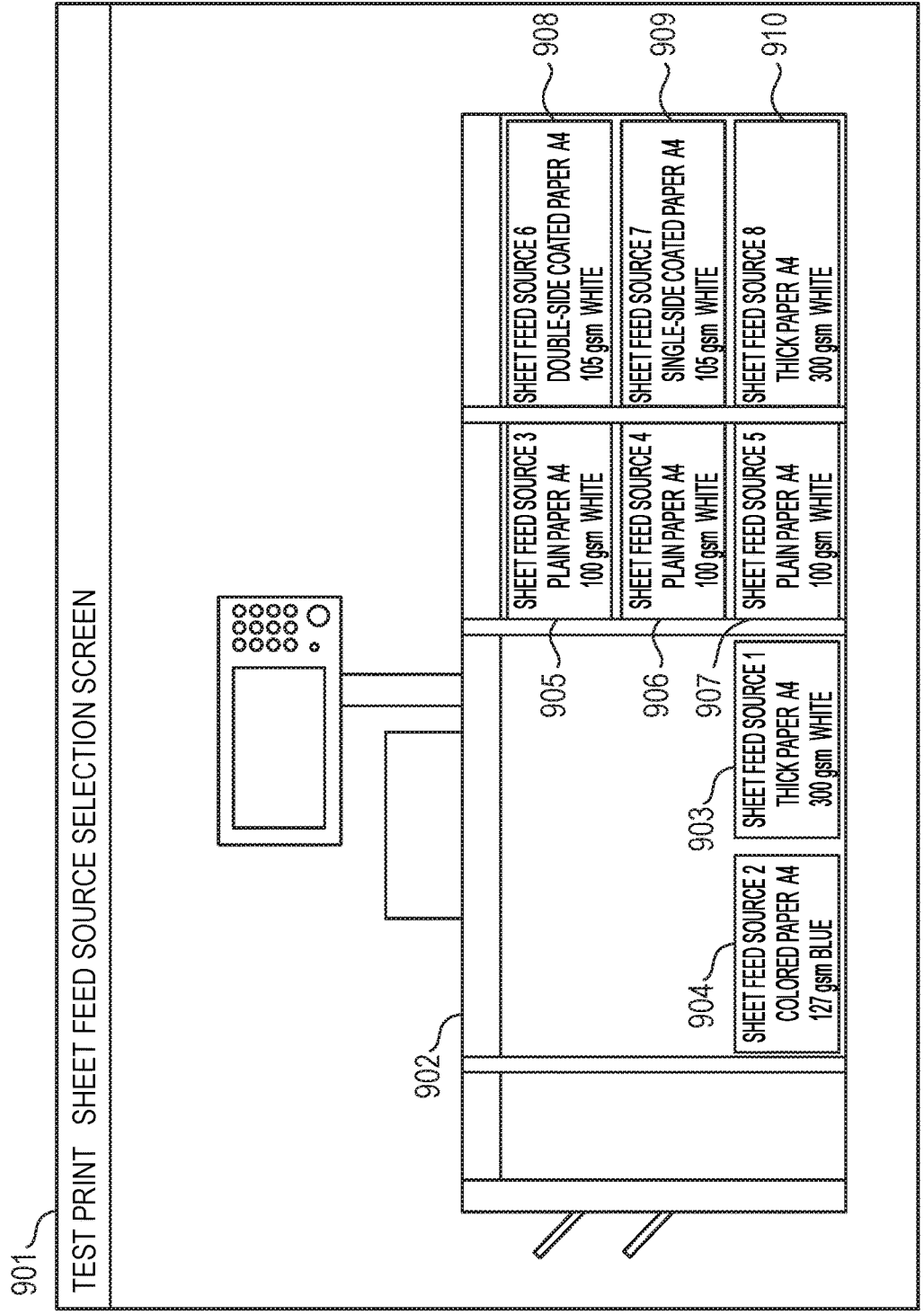
FIG. 9 is a view illustrating a sheet feed source screen at the time of a test print.

If a "cancel" button 809 is pressed, the secondary transfer voltage adjustment screen 801 is closed without the values set in the text boxes 802 and 803 being reflected in the adjustment values for the secondary transfer voltage. A "test print" button 810 is a button that executes a test print to check what kind of printing result will be obtained by the adjusted setting values. When the "test print" button 810 is pressed, a test print sheet feed source selection screen 901 illustrated in FIG. 9 opens.

In accordance with an instruction from the CPU 301, the test print sheet feed source selection screen 901 is rendered into the video memory thereof, and the image data rendered into the video memory is output as a video signal to the display apparatus 113 and displayed. The test print sheet feed source selection screen 901 is a screen on which an image screen of the image forming apparatus 103 and buttons for the sheet feed sources are arranged.

A hardware options screen 902 shows the connection status of hardware options of the image forming apparatus 103 currently connected to the print control apparatus 102. The user can select a sheet feed source on which a secondary transfer voltage adjustment test is to be executed from among sheet feed source buttons 903 to 910 and perform printing on a sheet fed from the selected sheet feed source. In a case where the button 903 for the sheet feed source 1 is pressed, the sheet management application transmits to the image forming apparatus 103, the adjustment values for the secondary transfer voltage that were set in the text boxes 802 and 803 in FIG. 8 as well as test print execution information. The image forming apparatus 103 executes a test print based on these data items.

Figure 10:
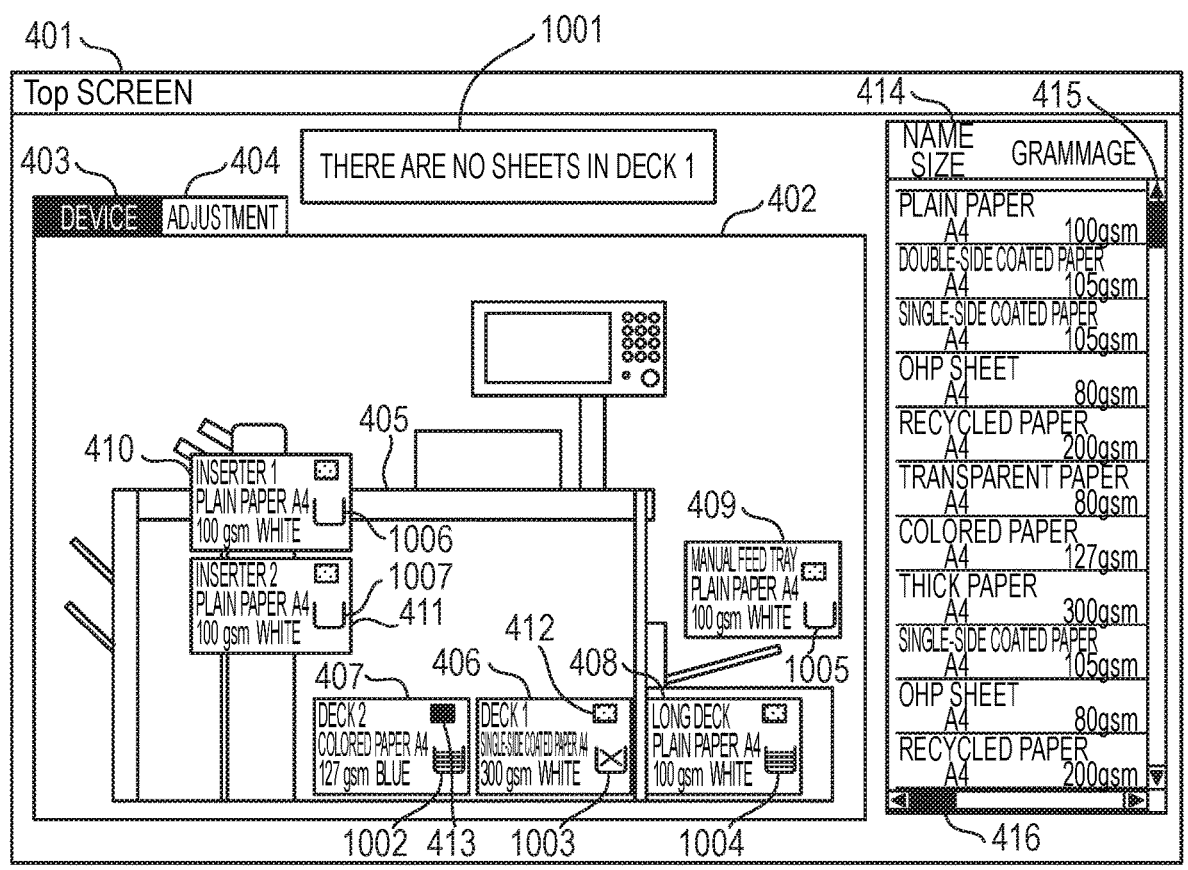
FIG. 10 is a view illustrating a top screen of the sheet management application.

FIG. 10 illustrates a screen that is the top screen 401 of the sheet management application, on which, in addition to the foregoing description of FIG. 4A, icons indicating the remaining quantity of sheets in the respective sheet feed sources are provided in the respective sheet feed source buttons. In accordance with an instruction from the CPU 301, the top screen 401 of the sheet management application is rendered in the video memory thereof, and the image data that was rendered into the video memory is output as a video signal to the display apparatus 113 and displayed. For example, because there are no printing sheets in the deck 1 406, in the present embodiment, by displaying "x" with an icon 1003, the user is warned that there is an abnormal state in which there are no printing sheets in the deck 1 406. Note that, other methods for showing a warning to the effect that there are no printing sheets include using a color that notifies an abnormality (for example, a red-colored display or a yellow-colored display) or using a blinking display, and any display method may be adopted as long as the display method shows a warning that indicates there is an abnormal state. In addition, a display method may be adopted that does not display icons, and instead displays a warning indicating an abnormal state by means of a character string as illustrated in a text box 1001.

Next, since printing sheets are stored in a deck 2 407 and a long deck 408, a normal state to the effect that printing sheets are loaded in these sheet feed sources is indicated as shown by icons 1002 and 1004. Note that, in order to indicate a normal state to the effect that printing sheets are in the relevant sheet feed sources, another display method may be adopted as long as the method is one which displays an icon that is equivalent to showing a normal state, such as using a color that notifies a normal state (for example, a green-colored display or a blue-colored display) or showing a blinking display of an icon. Even though there are no printing sheets in a manual feed tray 409, an inserter 1 410, or an inserter 2 411, as shown by icons 1005, 1006 and 1007, a normal state is indicated as in the case of the icons 1002 and 1004, and not a warning due to an abnormal state as shown by the icon 1003.

This is because, in general, in the case of a deck-type sheet feeding device, from the viewpoint of the user of the image forming apparatus, a state in which the deck-type sheet feeding device contains printing sheets is a "normal state", and a state in which the deck-type sheet feeding device does not contain printing sheets is an "abnormal state". On the other hand, in the case of a manual feed tray-type of sheet feed source, from the viewpoint of the user of the image forming apparatus, a state in which the manual feed tray-type of sheet feed source does not contain printing sheets is a "normal state". However, in a manual feed tray-type of sheet feed source, because a state in which printing sheets are contained therein is not necessarily an "abnormal state" and whether the state is a "normal state" or an "abnormal state" is determined on a case-by-case basis, such a state cannot be uniquely determined. Thus, because whether a state in which there are printing sheets or are not printing sheets is regarded as a normal state or an abnormal state from the viewpoint of the user differs depending on the property of the sheet feed source, it is necessary for warning displays to also be switched in accordance therewith.

Figure 11:
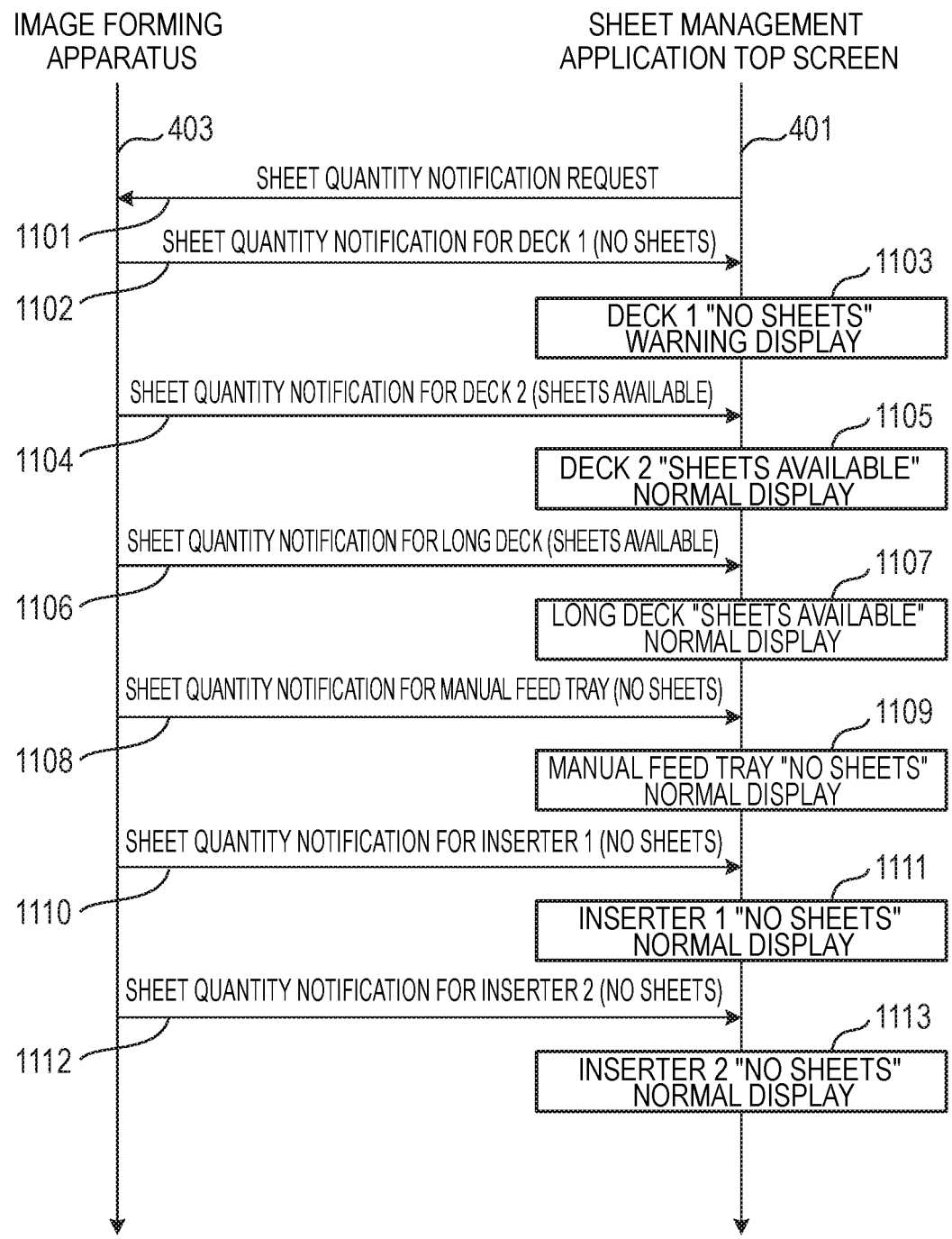
FIG. 11 is a timing chart of the image forming apparatus and the sheet management application.

FIG. 11 is a timing chart illustrating exchanges of sheet quantity information for each sheet feed source that are conducted between the image forming apparatus 103 and the top screen 401 of the sheet management application operating on the print control apparatus 102.

First, a sheet quantity notification request is sent from the sheet management application to the image forming apparatus 103 (1101).

Next, the image forming apparatus 103 notifies sheet quantity information for each of the sheet feed sources which the image forming apparatus 103 has, that is, information indicating at least whether or not there are sheets in the respective sheet feed sources, to the sheet management application through the print control apparatus 102. That is, the image forming apparatus 103 that received the sheet quantity notification request notifies a sheet quantity of "no sheets" for the deck 1 to the sheet management application (1102). The sheet management application that received the sheet quantity of "no sheets" for the deck 1 then displays a warning display indicating that there are "no sheets" by means of the icon 1003 in the sheet feed source button 406 for the deck 1 of the top screen 401 (1103).

Next, the image forming apparatus 103 notifies a sheet quantity of "sheets available" for the deck 2 to the sheet management application (1104). The sheet management application that received the sheet quantity of "sheets available" for the deck 2 then displays a normal display indicating that there are "sheets available" by means of the icon 1002 in the sheet feed source button 407 for the deck 2 of the top screen 401 (1105).

Thereafter, the image forming apparatus 103 notifies a sheet quantity of "sheets available" for the long deck to the sheet management application (1106). The sheet management application that received the sheet quantity of "sheets available" for the long deck then displays a normal display indicating that there are "sheets available" by means of the icon 1004 in the sheet feed source button 408 for the long deck of the top screen 401 (1107).

Next, the image forming apparatus 103 notifies a sheet quantity of "no sheets" for the manual feed tray to the sheet management application (1108). In this case, in general, with respect to a manual feed tray-type sheet feed source, a state in which printing sheets are not contained therein is a "normal state" from the viewpoint of the user of the printing apparatus. Therefore, even though there are no sheets in the manual feed tray, the sheet management application that receives the sheet quantity of "no sheets" for the manual feed tray then presents a normal display indicating that there are "no sheets" by means of the icon 1005 in the sheet feed source button 409 for the manual feed tray of the top screen 401 (1109).

Next, the image forming apparatus 103 notifies a sheet quantity of "no sheets" for the inserter 1 to the sheet management application (1110). In this case, similarly to the manual feed tray, the inserter is also a sheet feed source of a manual feed tray type for which a state in which printing sheets are not contained therein is a "normal state" from the viewpoint of the user of the printing apparatus. Therefore, similarly to the manual feed tray, even though there are no sheets in the inserter 1, the sheet management application that received the sheet quantity of "no sheets" for the inserter 1 then presents a normal display indicating that there are "no sheets" by means of the icon 1006 in the sheet feed source button 410 for the inserter 1 of the top screen 401 (1111).

Finally, the image forming apparatus 103 notifies a sheet quantity of "no sheets" for the inserter 2 to the sheet management application (1112). Similarly to the operation for the inserter 1, the sheet management application then presents a normal display indicating that there are "no sheets" by means of the icon 1007 in the sheet feed source button 411 for the inserter 2 (1113).

Figure 12:
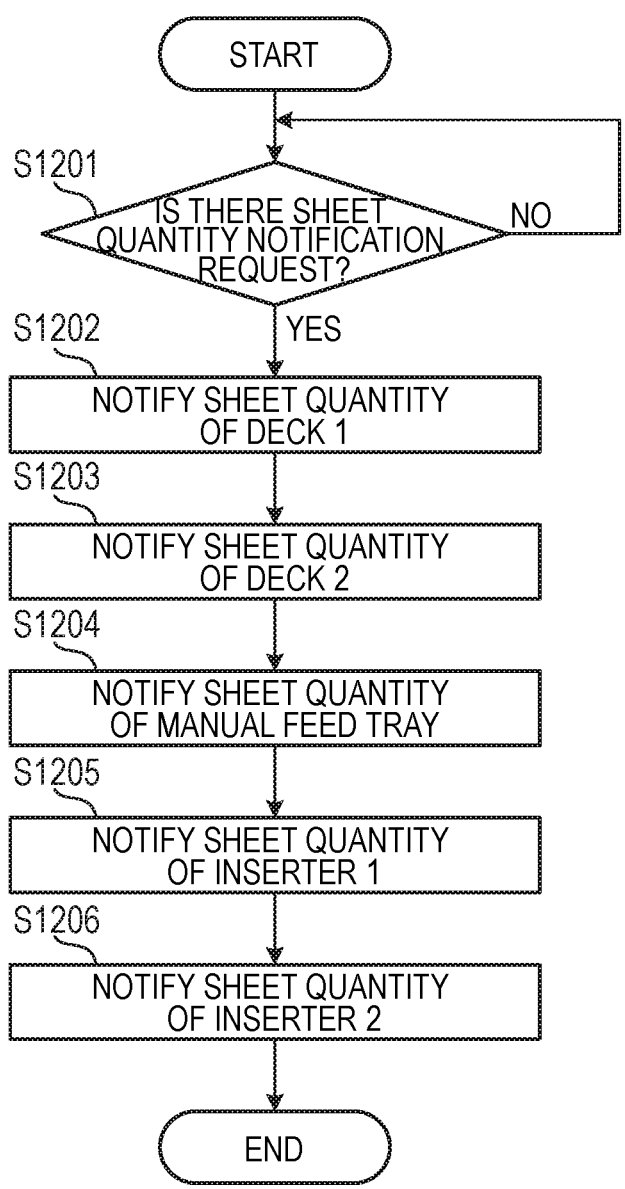
FIG. 12 is a flowchart of the image forming apparatus.

The flow of processing relating to notification of sheet quantity information for the sheet feed sources of the image forming apparatus 103 during the exchange of sheet quantity information for the sheet feed sources illustrated in FIG. 11 is illustrated in FIG. 12. The processing in FIG. 12 is realized by the CPU 201 reading out a program stored on the HDD 211 shown in FIG. 2, and expanding the program on the RAM 202 and executing the program. Further, the processing flow illustrated in FIG. 12 describes in further detail a step in which sheet feed source information is returned in S611 in response to an inquiry in a step of creating sheet feed source button information in S505 that is described above.

First, the image forming apparatus 103 receives a sheet quantity notification request that is transmitted from the sheet management application (S1201). Upon receiving the sheet quantity notification request, the image forming apparatus 103 notifies sheet quantity information (at least, whether or not there are sheets in the respective sheet feed sources) for each sheet feed source of the image forming apparatus 103 to the sheet management application through the print control apparatus 102 (S1202 to S1206).

The image forming apparatus 103 notifies the sheet quantity information in sequence to the sheet management application in the order of the sheet quantity of the deck 1 in S1201, the sheet quantity of the deck 2 in S1202, the sheet quantity of the long deck in S1203, the sheet quantity of the manual feed tray in S1204, the sheet quantity of the inserter 1 in S1205, and the sheet quantity of the inserter 2 in S1206.

<Processing for Creation of Sheet Feed Source Button Information>

Next, a step in which, after receiving the notifications of the sheet quantity information for the sheet feed sources from the image forming apparatus 103 (FIG. 11), the print control apparatus 102 creates sheet feed source button information for the top screen 401 of the sheet management application (S505 in FIG. 5) will be described in further detail using FIG. 13.

Figure 13:
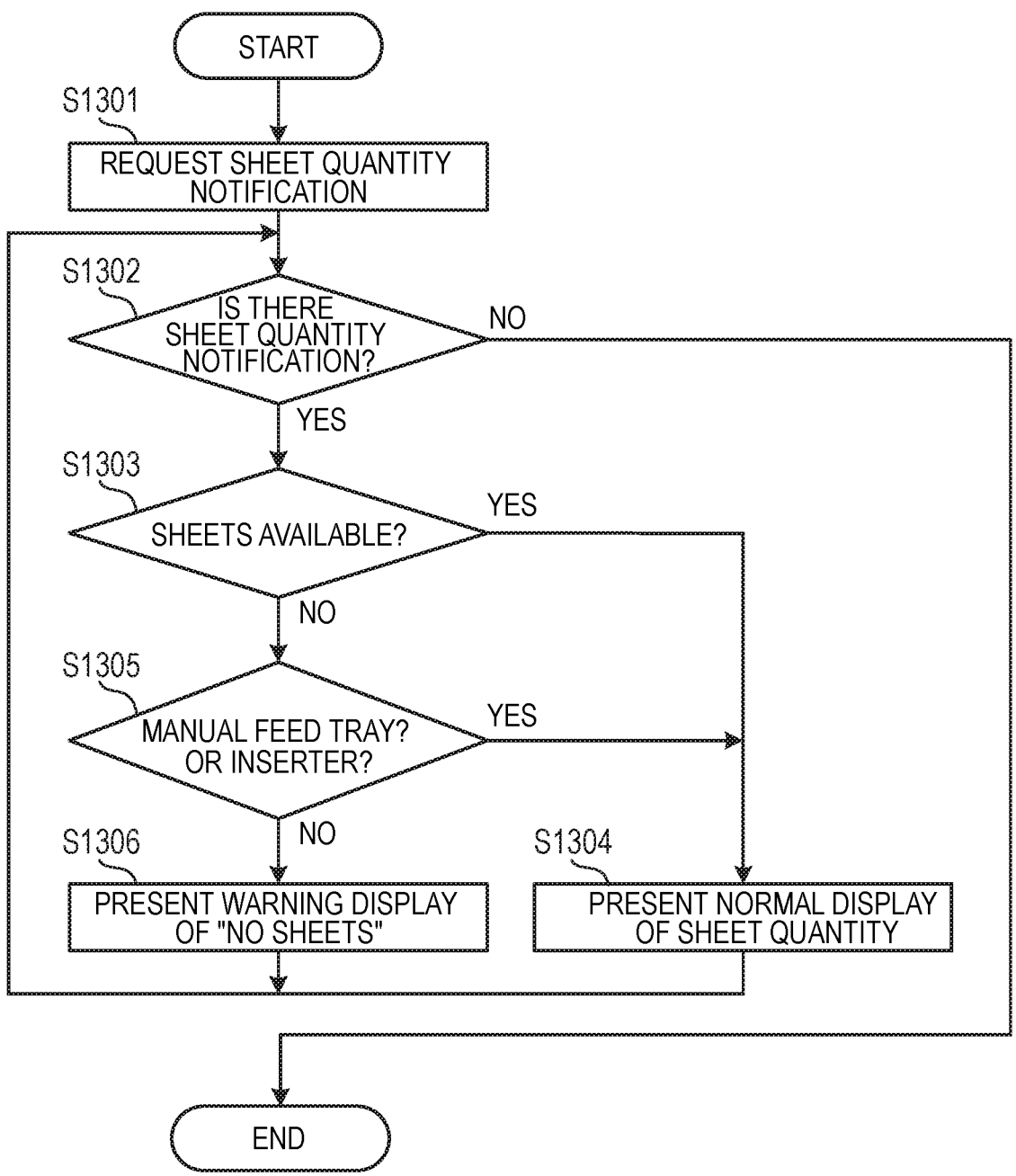
FIG. 13 is a flowchart of the sheet management application.

The flow of processing to create sheet feed source button information shown in FIG. 13 is realized by the CPU 301 of the print control apparatus 102 reading out a program stored on the HDD 309, and expanding the program on the RAM 302 and executing the program.

First, the sheet management application operating on the print control apparatus 102 transmits a sheet quantity notification request to the image forming apparatus 103 (S1301).

Next, the sheet management application waits for a predetermined time for a sheet quantity notification for the respective sheet feed sources from the image forming apparatus 103, and determines whether or not a sheet quantity notification was received (S1302). In S1302, if it is not determined that a sheet quantity notification was received for any of the sheet feed sources, since the sheet management application has finished receiving sheet quantity notifications for all of the sheet feed sources, the sheet management application ends the present processing flow of the printing system.

In contrast, if it is determined in S1302 that a sheet quantity notification was received for any of the sheet feed sources, the sheet management application determines whether or not the relevant sheet quantity notification is a notification indicating "sheets available" (S1303).

If it is determined that the relevant sheet quantity notification is a notification indicating "sheets available" by means of S1303, the sheet management application transitions to S1304. In contrast, if it is determined in S1303 that the relevant sheet quantity notification is a notification indicating "no sheets", the sheet management application determines whether the relevant sheet feed source is a manual feed-type sheet feed source, that is, a manual feed tray or an inserter (S1305).

In S1305, if it is determined that the relevant sheet feed source is a manual feed-type sheet feed source, that is, a manual feed tray or an inserter, the sheet management application transitions to S1304.

In S1304, the sheet management application displays an icon of the sheet feed source button in a manner indicating that the sheet quantity notified from the image forming apparatus 103 is a normal state, and returns to S1302.

If it is not determined in S1305 that the relevant sheet feed source is a manual feed-type sheet feed source, that is, a manual feed tray or an inserter, the sheet management application displays an icon of the sheet feed source button in a manner that shows a warning display which indicates that the sheet quantity notified from the image forming apparatus 103 is an abnormal state of "no sheets" (S1306), and then returns to S1302.

As described above, even in a printing apparatus that includes a mixture of sheet feed sources for which a state regarded as a normal state as well as the definition of a "normal state" differ, that is, a printing apparatus that includes a mixture of manual feed-type sheet feed sources and normal sheet feed sources with respect to which the points of view regarding what constitutes a "normal state" as well as the definition of a "normal state" differ, the printing system of Embodiment 1 enables an appropriate warning display relating to the presence/absence of printing sheets for the respective sheet feed sources.

Embodiment 2

In Embodiment 1, in a case where no printing sheets are contained in a manual feed-type sheet feed source, that is, a manual feed tray or an inserter, a normal state is uniformly displayed by means of an icon or a character string. However, in a case where, during the course of performing printing using a manual feed-type sheet feed source, the printing sheets of the manual feed-type sheet feed source unintentionally run out, it is essential to reload printing sheets in order to continue and complete the printing. In a case where a state in which printing sheets are contained in a manual feed-type sheet feed source changes to a state in which there are no printing sheets in the manual feed-type sheet feed source, it can be said that the state in which there are no printing sheets in the manual feed-type sheet feed source is an abnormal state, and not a normal state, and in such a case a warning display can be presented to the user.

In Embodiment 2 a configuration is adopted in which, in a case where the sheet management application operating on the print control apparatus 102 receives a notification from the image forming apparatus 103 to the effect that there are no remaining printing sheets in a manual feed-type sheet feed source after a state in which printing sheets are loaded in the manual feed-type sheet feed source, control can be performed to display a warning to the effect that there are no remaining printing sheets in the manual feed-type sheet feed source by means of a message or an icon.

Hereunder, in some cases only differences from Embodiment 1 are described, and duplicate descriptions may also be omitted.

Figure 14A:
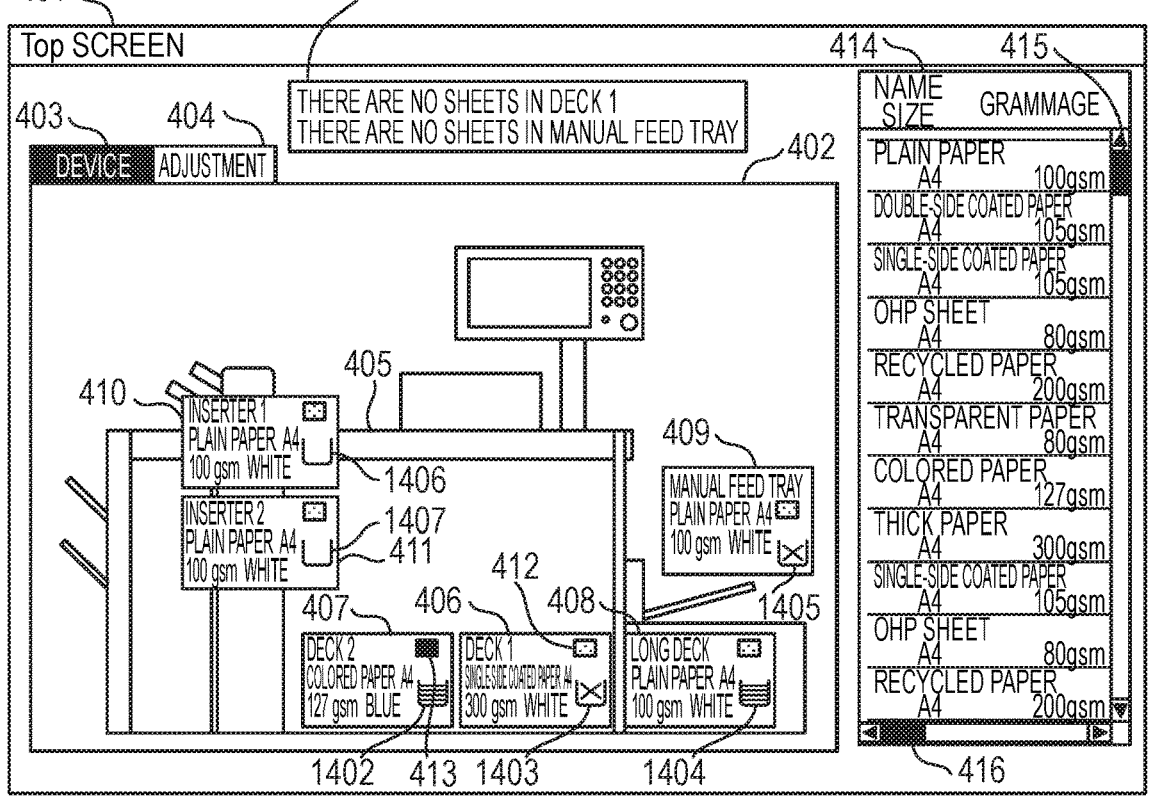
FIGS. 14A and 14B are views illustrating a top screen of the sheet management application.

FIG. 14A illustrates a screen that is the top screen 401 of the sheet management application, on which, in addition to the foregoing description of FIG. 4A, icons indicating the remaining quantity of sheets of the respective sheet feed source are provided in the respective sheet feed source buttons. In accordance with an instruction from the CPU 301, the top screen 401 of the sheet management application is rendered into the video memory thereof, and the image data that was rendered into the video memory is output as a video signal to the display apparatus 113 and displayed.

For example, because there are no printing sheets in the deck 1 406, in Embodiment 2, by displaying "x" with an icon 1403, the user is warned that there is an abnormal state in which there are no printing sheets in the deck 1 406. Note that other display methods for presenting a warning to the effect that there are no printing sheets may be the same as those described in Embodiment 1.

In addition, a method may be adopted that does not use an icon display, and instead displays a warning indicating an abnormal state by means of a character string on a display unit 1401. Next, since printing sheets are stored in the deck 2 407 and the long deck 408, a normal state to the effect that printing sheets are loaded in these sheet feed sources is indicated as shown by icons 1402 and 1404. Note that other display methods for representing a normal state to the effect that there are printing sheets loaded in the relevant sheet feed source may be the same as those described in Embodiment 1.

In a case where the manual feed tray 409 contained printing sheets, but unintentionally the printing sheets of the manual feed tray 409 ran out during the course of performing printing of a print job, it is essential to reload printing sheets in order to continue and complete the printing. In Embodiment 2, by displaying "x" with an icon denoted by reference numeral 1405, the user is warned that there is an abnormal state in which there are no printing sheets loaded in the manual feed tray 409. Note that other display methods for indicating a warning to the effect that printing sheets are not loaded may be the same as those described in Embodiment 1.

In addition, a configuration may be adopted in which, instead of an icon display, a warning indicating an abnormal state is displayed by means of a character string on the display unit 1401. On the other hand, although, similarly to the manual feed tray 409, there are no printing sheets loaded in the inserter 1 410 and the inserter 2 411, because the original state of each of the inserter 1 410 and the inserter 2 411 was a state in which printing sheets were not loaded therein, and this is not a case where a state in which printing sheets were loaded changed to a state in which printing sheets were not loaded as in the case of the manual feed tray, as shown by icons 1406 and 1007, a normal state is displayed in the same manner as for the icon 1402 and icon 1404, and not a warning due to an abnormal state as indicated by the icon 1403 or the icon 1405. Thus, because whether a state in which there are or are not printing sheets is regarded as a normal state or an abnormal state from the viewpoint of the user differs according to the state transition of the sheet feed source in addition to the property of the sheet feed source, it is necessary for warning displays to also be switched in accordance therewith.

Figure 14B:
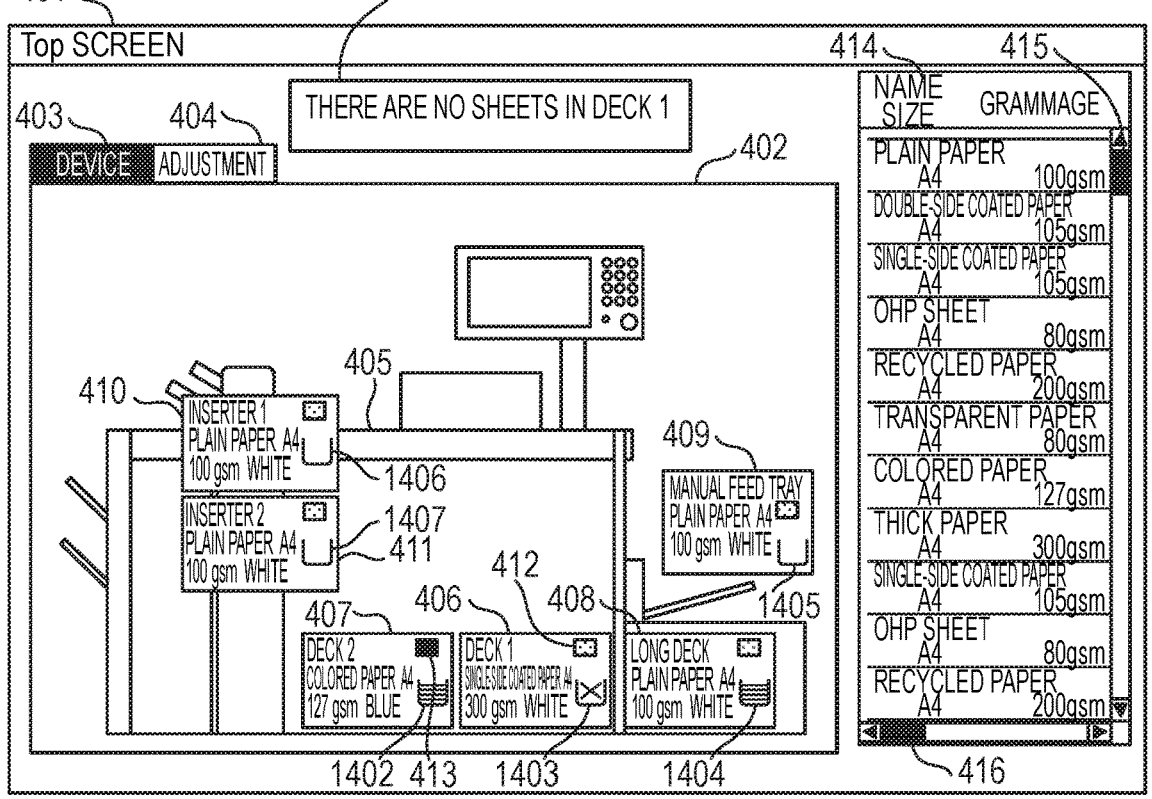

FIG. 14B illustrates a screen that shows a state which is entered after a predetermined time period passes from the state illustrated in FIG. 14A. That is, FIG. 14B illustrates a display that transitioned from a state in which the user was being warned of an abnormal state in which printing sheets were not loaded by displaying "x" with the icon 1405 to a normal state as shown with an icon 1405 that is displayed in the same manner as the icon 1406 or 1407, and not a warning due to an abnormal state, because a predetermined time period has passed. Further, a warning display indicating an abnormal state of the manual feed tray 409 by means of a character string is not displayed by the display unit 1401.

The reason for this is that although the user was being warned of an abnormal state in which printing sheets are not loaded by showing a character string or "x" with the icon 1405 on the display unit 1401, the sheet management application is set so as to determine that a warning display due to an abnormal state is no longer necessary after a predetermined time period passes. Note that, the predetermined time period may be set as a fixed value in the sheet management application or a configuration may be adopted which allows the user to set a desired value in the sheet management application, and these are not limited by the present invention.

Figure 15:
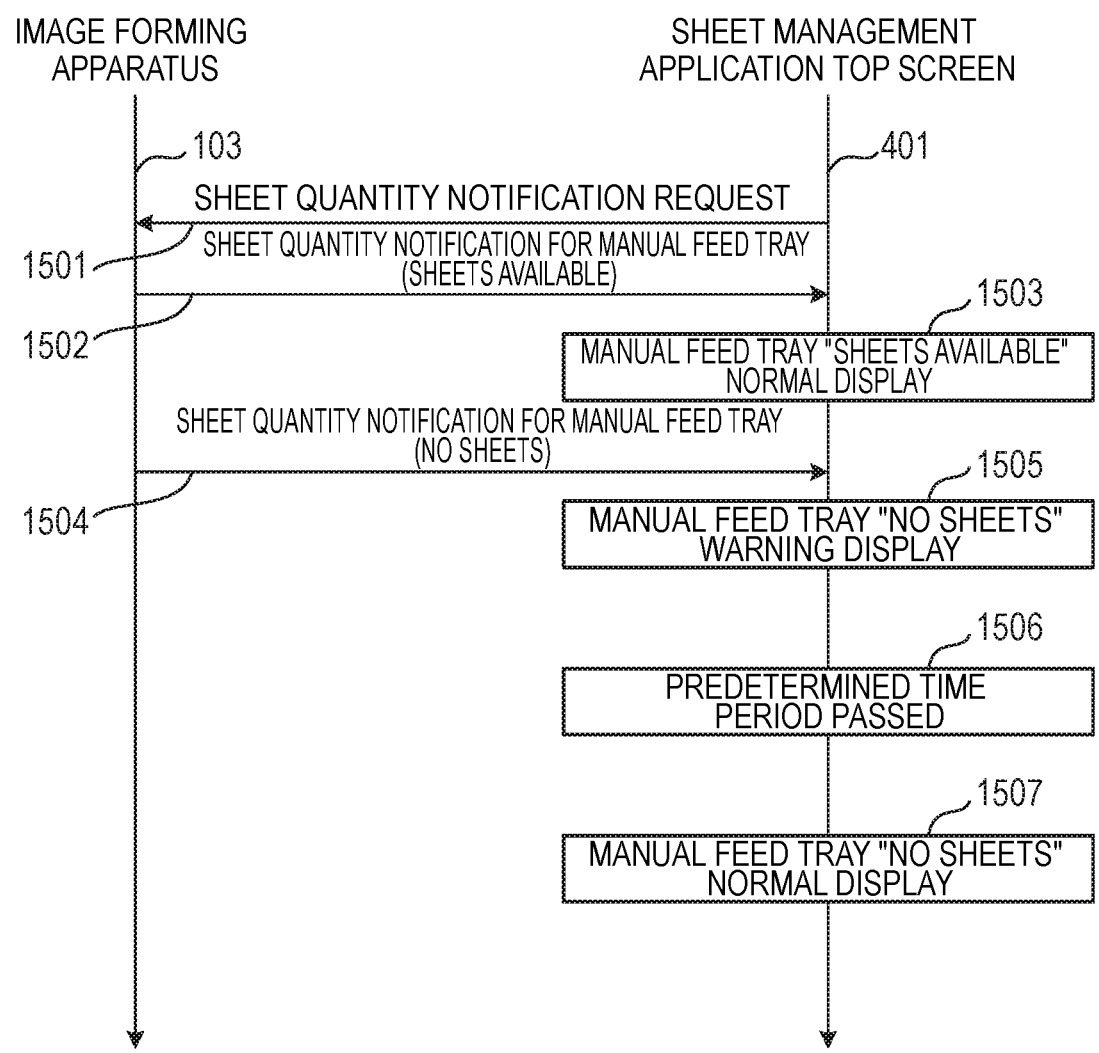
FIG. 15 is a timing chart of the image forming apparatus and the sheet management application.

FIG. 15 is a timing chart illustrating exchanges of information that are performed between the image forming apparatus 103 and the top screen 401 of the sheet management application operating on the print control apparatus 102.

First, a sheet quantity notification request is sent from the sheet management application to the image forming apparatus 103 (1501).

Next, the image forming apparatus 103 notifies sheet quantity information for each of the sheet feed sources of the image forming apparatus 103, that is, information indicating at least whether or not there are sheets in the respective sheet feed sources, to the sheet management application through the print control apparatus 102.

In this case, notification of the sheet quantity information of the manual feed tray 409 by the image forming apparatus 103 is illustrated, and illustrations relating to notification of the sheet quantity information of the other sheet feed sources are omitted. The image forming apparatus 103 notifies the sheet quantity of "sheets available" for the manual feed tray to the sheet management application (1502).

The sheet management application that received the notification of the sheet quantity of "sheets available" for the manual feed tray temporarily displays a normal display indicating the sheet quantity of "sheets available" for the manual feed tray by means of an icon in the sheet feed source button 409 for the manual feed tray of the top screen 401 (1503).

Next, for example, in a case where the printing sheets in the manual feed tray run out while printing of a print job is being performed, the image forming apparatus 103 notifies the sheet quantity "no sheets" for the manual feed tray to the sheet management application (1504). In this case, although the state up to this point had been one in which printing sheets were loaded in manual feed tray, unintentionally the printing sheets in the manual feed tray ran out while performing printing of the print job, and therefore the sheet management application displays a warning display for an abnormal state of "no sheets" with respect to the sheet quantity of the manual feed tray by means of the icon 1405 in the sheet feed source button 409 for the manual feed tray of the top screen 401 (FIG. 14A) (1505).

Next, the sheet management application waits for a predetermined time period to pass from starting to display the warning display for the abnormal state of "no sheets" with respect to the sheet quantity of the manual feed tray by means of the icon 1405 (1506).

Subsequently, after the predetermined time period passes from the time of starting to display the warning display for the abnormal state of "no sheets" with respect to the sheet quantity of the manual feed tray by means of the icon 1405, the sheet management application changes from the warning display due to the abnormal state to a normal display of "no sheets" for the sheet quantity of the manual feed tray by means of the icon 1405 (FIG. 14B) (1507).

Figure 16:
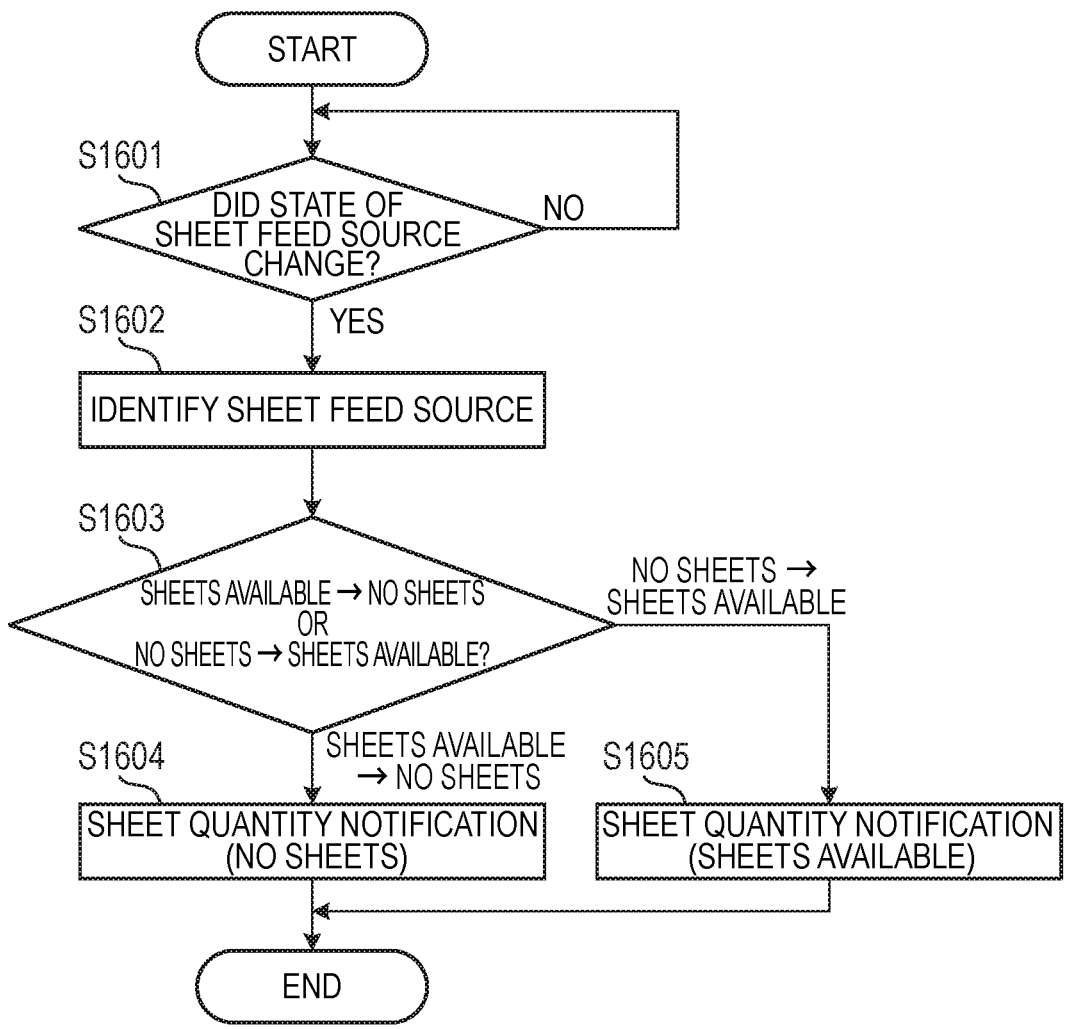
FIG. 16 is a flowchart of the image forming apparatus.

Next, processing in which the image forming apparatus 103 notifies the sheet management application of the sheet quantity of "no sheets" for the manual feed tray in a case where printing sheets in the manual feed tray ran out while performing printing of a print job will be described in detail referring to FIG. 16.

A program for the present processing is stored on the HDD 211 shown in FIG. 2, and is read out onto the RAM 202 and executed by the CPU 201.

First, the CPU 201 detects for a change in the state of each sheet feed source, that is, detects whether a state in which there are printing sheets in a given sheet feed source changed to a state in which there are no printing sheets, or whether a state in which there are no printing sheets in a given sheet feed source changed to a state in which there are printing sheets (S1601).

Next, the CPU 201 identifies at which sheet feed source a state has changed (S1602).

Thereafter, the CPU 201 determines whether the sheet feed source identified in S1602 changed from a state in which there are printing sheets to a state in which there are no printing sheets, or changed from a state in which there are no printing sheets to a state in which there are printing sheets (S1603).

In S1603, if it is determined that the relevant sheet feed source changed from a state in which there are printing sheets to a state in which there are no printing sheets, the image forming apparatus 103 notifies the sheet management application that the sheet quantity for the identified sheet feed source is "no sheets" (S1604), and then ends the processing.

On the other hand, in S1603, if it is determined that the relevant sheet feed source changed from a state in which there are no printing sheets to a state in which there are printing sheets, the image forming apparatus 103 notifies the sheet management application of the print control apparatus 102 that the sheet quantity for the identified sheet feed source is "sheets available" (S1605), and then ends the processing.

Next, processing that the sheet management application which received the sheet quantity of "no sheets" for the manual feed tray performs in 1505 in FIG. 15 to display a warning display for an abnormal state of "no sheets" for the manual feed tray sheet quantity by means of the icon 1405 in the sheet feed source button 409 for the manual feed tray of the top screen 401 will be described in detail using a flowchart illustrated in FIG. 17.

Figure 17:
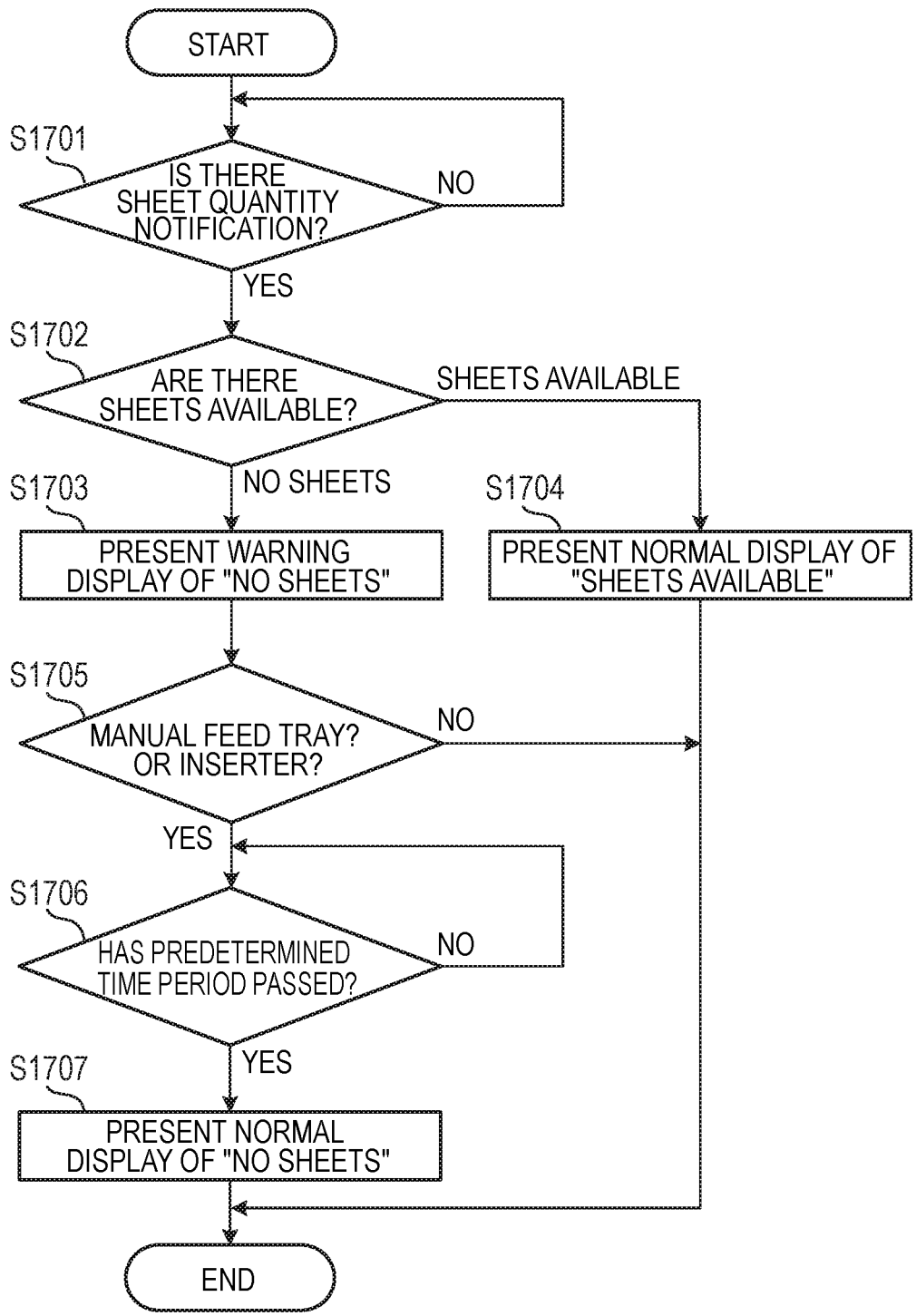
FIG. 17 is a flowchart of the sheet management application.

A program of the print control apparatus 102 relating to the flowchart in FIG. 17 is stored on the HDD 309 shown in FIG. 3, and is read out to the RAM 302 and executed by the CPU 301.

First, the sheet management application operating on the print control apparatus 102 receives a sheet quantity notification for the sheet feed source from the image forming apparatus 103 (S1701).

Next, the sheet management application determines whether the sheet quantity notification for the sheet feed source received from the image forming apparatus 103 is a notification that, at a given sheet feed source, a state in which there are printing sheets changed to a state in which there are no printing sheets, or is a notification that a state in which there are no printing sheets changed to a state in which there are printing sheets (S1702).

In S1702, if it is determined that the received notification is a notification of a change from a state in which there are no printing sheets to a state in which there are printing sheets, the sheet management application displays the sheet quantity of "sheets available" for the relevant sheet feed source as a normal state (S1704), and ends the present processing flow of the printing system.

On the other hand, in S1702, if it is determined that the received notification is a notification of a change from a state in which there are printing sheets to a state in which there are no printing sheets, the sheet management application displays a warning display that indicates the sheet quantity of "no sheets" for the relevant sheet feed source as an abnormal state (S1703).

Next, the sheet management application determines whether the relevant sheet feed source is a manual feed-type sheet feed source, that is, is a manual feed tray or an inserter (S1705).

In S1705, if it is determined that the relevant sheet feed source is not a manual feed-type sheet feed source, that is, is not a manual feed tray or an inserter, the sheet management application ends the present processing flow of the printing system.

On the other hand, in S1705, if it is determined that the relevant sheet feed source is a manual feed-type sheet feed source, that is, is a manual feed tray or an inserter, the sheet management application waits for a predetermined time period to pass from the time of starting the warning display indicating an abnormal state of a sheet quantity of "no sheets" for the sheet feed source in S1703 (S1706).

After passage of the predetermined time period is determined in S1706, the sheet management application switches from the warning display indicating an abnormal state of a sheet quantity of "no sheets" for the sheet feed source that is displayed by the processing in S1703 to a display showing the sheet quantity of "no sheets" for the sheet feed source as a normal state (S1707), and then ends the present processing flow of the printing system.

As described above, according to Embodiment 2, for a printing apparatus that includes a mixture of sheet feeding devices for which the idea with respect to what constitutes a normal state differs, the printing system also takes into consideration the state transitions of the sheet feeding devices and enables appropriate warning displays in relation to the presence or absence of printing sheets for each of the sheet feeding devices.

Embodiment 3

Next, Embodiment 3 of the present invention will be described in detail referring to the accompanying drawings. Note that, in the present embodiment in some cases only differences from Embodiment 1 and Embodiment 2 are described, and duplicate descriptions may also be omitted.

According to Embodiment 2, in a case where, for example, a situation arises in which printing sheets run out during printing at a manual feed tray-type sheet feed source, that is, in a case where a transition occurred from a state in which there are printing sheets in the sheet feed source to a state in which there are no printing sheets, a warning to the effect that there are no remaining printing sheets in the manual feed-type sheet feed source is displayed. However, even in a state in which printing sheets are not loaded in a manual feed-type sheet feed source at a given time point, in a case where a print job for which printing is to be subsequently executed is awaiting execution at the print control apparatus 102, that is, in a case where there is a print job in a print queue, and it is known that the print job will use a manual feed-type sheet feed source, it is essential to reload printing sheets into the manual feed-type sheet feed source in order to perform printing of the relevant print job without delay and avoid an interruption to the print job caused by having no printing sheets after printing of the print job actually starts.

That is, in this case, a state in which printing sheets are not loaded in a manual feed-type sheet feed source can be treated in advance as an abnormal state, and not a normal state, and a warning display can be displayed to the user. Therefore, in the present embodiment, in a case where the state is one in which printing sheets are not loaded in a manual feed-type sheet feed source and where it is clear that a print job that will use the manual feed-type sheet feed source is present among spooled print jobs at the print control apparatus 102 for which printing is scheduled to be performed at the image forming apparatus 103, the sheet management application operating on the print control apparatus 102 performs control to display a warning to the effect that there are no remaining printing sheets at the manual feed-type sheet feed source by means of a message or a GUI.

Figure 18:
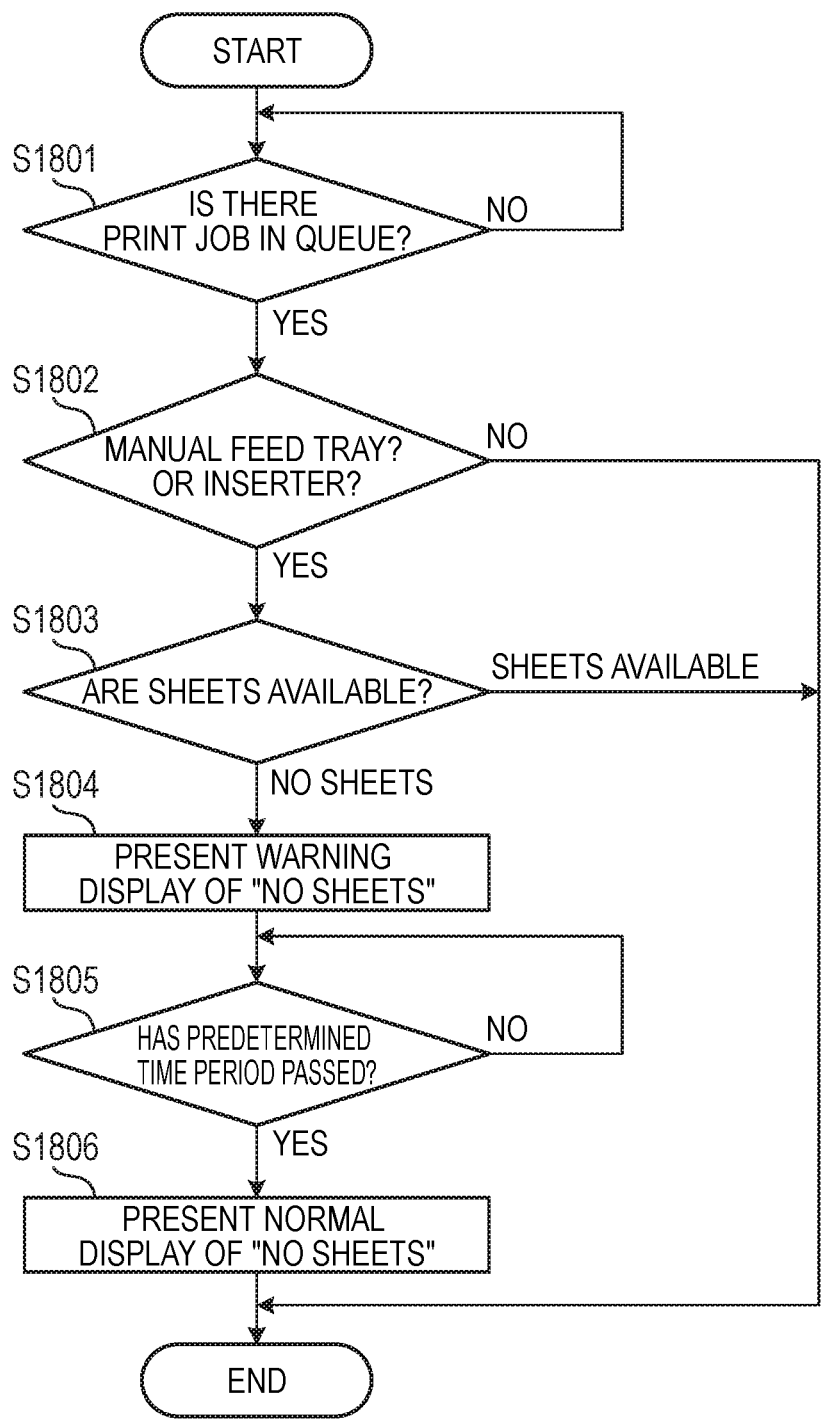
FIG. 18 is a flowchart of the sheet management application.

A program of the print control apparatus 102 that relates to the flowchart in FIG. 18 is stored on the HDD 309 shown in FIG. 3, and is read out to the RAM 302 and executed by the CPU 301.

First, the sheet management application operating on the print control apparatus 102 detects whether there is a print job for which printing is to be subsequently executed at the print control apparatus 102, that is, detects that there is a print job in a print queue (S1801).

Next, the sheet management application determines if the print job detected in S1801 will use a manual feed-type sheet feed source such as a manual feed tray or an inserter (S1802). If it is determined in S1802 that the print job detected in S1801 will not use a manual feed-type sheet feed source such as a manual feed tray or an inserter, the sheet management application ends the present processing flow of the printing system.

On the other hand, if it is determined in S1802 that the print job detected in S1801 will use a manual feed-type sheet feed source such as a manual feed tray or an inserter, the sheet management application determines whether or not there are printing sheets in the manual feed-type sheet feed source that is to be used for the print job (S1803).

If it is determined in S1803 that there are printing sheets in the manual feed-type sheet feed source that is to be used for the print job, the sheet management application ends the present processing flow of the printing system. On the other hand, if it is determined in S1803 that there are no printing sheets in the manual feed-type sheet feed source that is to be used for the print job, the sheet management application displays a warning display in which the sheet quantity of "no sheets" is displayed as an abnormal state for the manual feed-type sheet feed source (S1804).

Next, the sheet management application waits for a predetermined time period to pass after the start of the warning display of the abnormal state of the sheet quantity of "no sheets" of the manual feed-type sheet feed source executed in S1804 (S1805). After waiting for the passage of the predetermined time period in S1805, the sheet management application switches from the warning display of the abnormal state of the sheet quantity of "no sheets" of the sheet feed source executed in S1804 to displaying the sheet quantity of "no sheets" of the manual feed-type sheet feed source as a normal state (S1806). The sheet management application then ends the present processing flow of the printing system.

Thus, in S1806, a switch is made from the warning display of the abnormal state of the sheet quantity of "no sheets" of the sheet feed source to displaying the sheet quantity of "no sheets" of the manual feed-type sheet feed source as a normal state. The reason for this is that although the user was warned of an abnormal state in which printing sheets are not loaded in the manual feed-type sheet feed source by the processing in S1804, a predetermined time period was determined to have passed based on the processing in S1805 and the sheet management application determined that a warning display due to an abnormal state was not required any longer. Note that, the predetermined time period may be set as a fixed value in the sheet management application or a configuration may be adopted which allows the user to set a desired value in the sheet management application, and these are not limited by the present invention.

Further, in a case where sheets were reloaded also, the display may be switched to be shown as a normal state.

As described above, according to Embodiment 3, for a printing apparatus that has sheet feeding devices for which the idea with respect to what constitutes a normal state differs, the printing system also takes into consideration which sheet feeding device is to be used with a scheduled print job, and thereby enables appropriate warning displays in relation to the presence or absence of printing sheets for each of the sheet feeding devices.

Embodiment 4

Next, Embodiment 4 of the present invention will be described in detail referring to the accompanying drawings. Note that, in the description of Embodiment 4, in some cases only differences from Embodiments 1 to 3 are described, and duplicate descriptions may also be omitted.

According to Embodiment 3, even when there are no printing sheets in a manual feed-type sheet feed source at a given time point, in a case where a print job for which a manual feed-type sheet feed source will be used is in a print queue, a warning to the effect that there are no remaining printing sheets in the manual feed-type sheet feed source is displayed. Because of such a warning display, printing sheets can be reloaded in the manual feed-type sheet feed source by the user and printing of the print job can be completed without delay. However, thereafter, if printing sheets remain in the manual feed-type sheet feed source in which the printing sheets were reloaded, and a state in which the printing sheets are left in the manual feed-type sheet feed source continues, there is the problem that the state of the printing sheets will deteriorate.

It is known that, in general, if the state of printing sheets deteriorates, the quality of the final printed product obtained using the printing sheets will also decrease. That is, in this case, even though the state is one in which printing sheets are loaded in a manual feed-type sheet feed source, if there is no print job that will use the manual feed-type sheet feed source in a print queue, the sheet quantity of "sheets available" for the manual feed-type sheet feed source is treated as an abnormal state. Therefore, a warning display can be shown to make the user aware that some printing sheets remain in the manual feed-type sheet feed source.

Therefore, in Embodiment 4, in a case where a predetermined time period passed in a state in which printing sheets are loaded in a manual feed-type sheet feed source that is a state in which there is no print job that will use the manual feed-type sheet feed source among jobs that are scheduled for printing, the sheet management application operating on the print control apparatus 102 is configured so as to perform control that displays a warning to the effect that there are printing sheets remaining in the manual feed-type sheet feed source.

Figure 19:
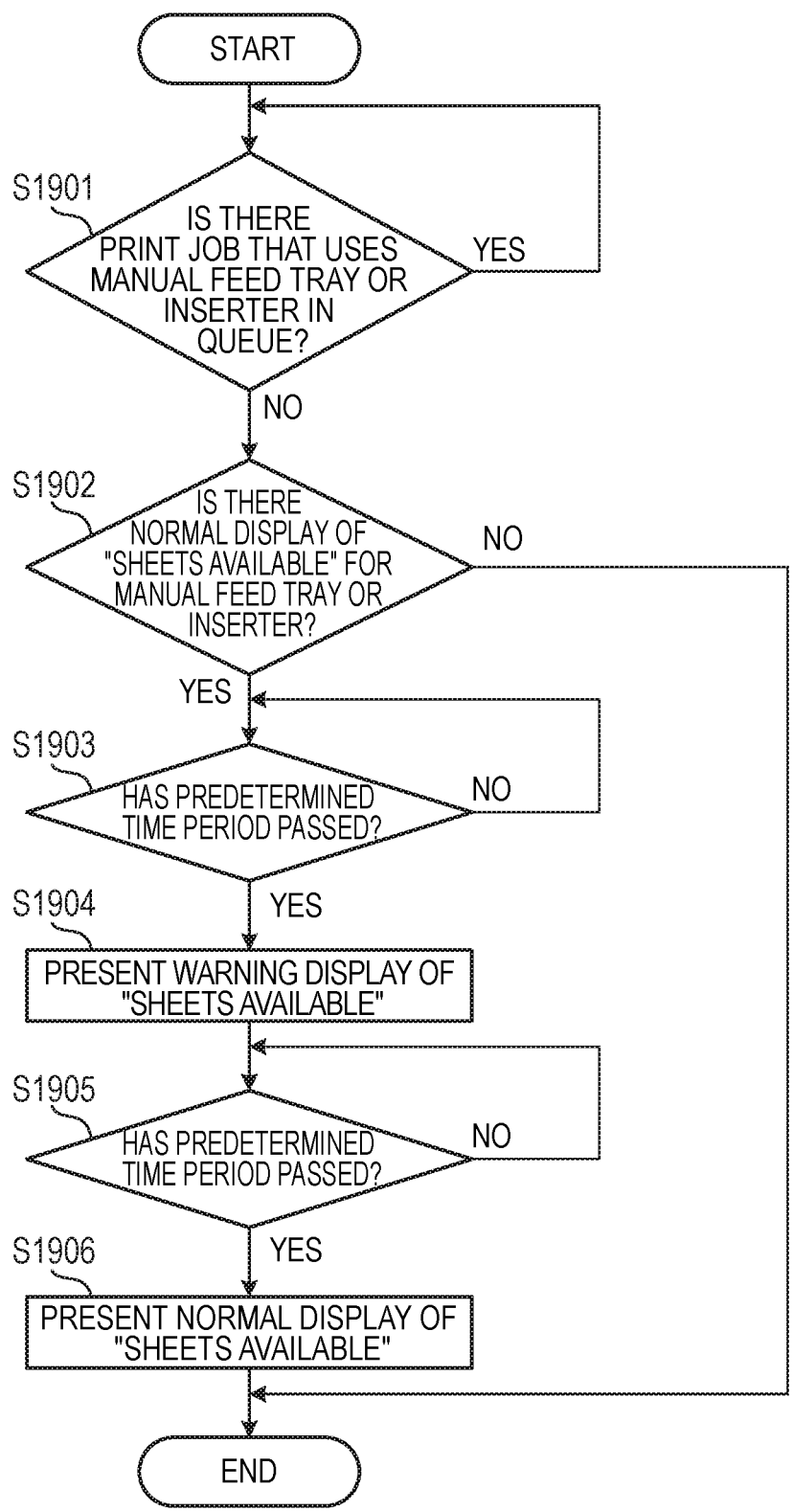
FIG. 19 is a flowchart of the sheet management application.

A program of the print control apparatus 102 relating to a flowchart in FIG. 19 is stored on the HDD 309 shown in FIG. 3 and is read out onto the RAM 302 and executed by the CPU 301.

First, the sheet management application operating on the print control apparatus 102 detects that there is no print job for which printing is to be subsequently executed using a manual feed-type sheet feed source such as a manual feed tray or an inserter present at the print control apparatus 102 (S1901).

Next, the sheet management application determines whether the sheet quantity of "sheets available" of the manual feed-type sheet feed source is being displayed as a normal state (S1902). If it is determined in S1902 that the sheet quantity of "sheets available" of the manual feed-type sheet feed source is not being displayed as a normal state, the sheet management application ends the present processing flow of the printing system. On the other hand, if it is determined in S1902 that the sheet quantity of "sheets available" of the manual feed-type sheet feed source is being displayed as a normal state, the sheet management application waits for a predetermined time period to pass after the start of the display of the sheet quantity of "sheets available" of the manual feed-type sheet feed source in a normal state (S1903).

After the predetermined time period passes in S1903, the sheet management application switches from the display of the sheet quantity of "sheets available" of the sheet feed source in the normal state to a warning display in which the sheet quantity of "sheets available" of the manual feed-type sheet feed source is displayed as an abnormal state (S1904).

Next, the sheet management application waits for a predetermined time period to pass after the start of the warning display of the sheet quantity of "sheets available" of the manual feed-type sheet feed source as an abnormal state in S1904 (S1905).

After the predetermined time period passes in S1905, the sheet management application switches from the warning display of the sheet quantity of "sheets available" of the sheet feed source as an abnormal state executed by the processing in S1904 to a display that shows the sheet quantity of "sheets available" of the manual feed-type sheet feed source as a normal state (S1906). The sheet management application then ends the present processing flow of the printing system. In this case, by the processing in S1906, the display is switched from a warning display that shows the sheet quantity of "sheets available" of the sheet feed source as an abnormal state to a display that shows the sheet quantity of "sheets available" of the manual feed-type sheet feed source as a normal state. The reason for this is that although the user is warned of an abnormal state in which printing sheets are loaded in the manual feed-type sheet feed source by the processing in S1904, a predetermined time period passes during the processing in S1905 and the sheet management application determines that a warning display due to an abnormal state is no longer required thereafter. Note that, the predetermined time period may be set as a fixed value in the sheet management application or a configuration may be adopted which allows the user to set a desired value in the sheet management application, and these are not limited by the present invention.

Thus, according to the present embodiment, the printing system also takes into consideration a fact that printing sheets remain in a sheet feeding device of a manual feed type or an inserter or the like, and thereby enables appropriate warning displays in relation to the presence or absence of printing sheets for each sheet feeding device.

Other Embodiments

The present invention can also be realized by a process in which a program that realizes one or more functions according to the above embodiments is supplied to a system or an apparatus through a network or a storage medium, and one or more processors in a computer of the system or the apparatus read and execute the program. In addition, the present invention can be realized by a circuit (for example, an ASIC) that realizes the one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{T}$n, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-201539, filed Oct. 18, 2017 which is hereby incorporated by reference herein in its entirety.

What is claimed is:

1. An image forming system which includes an image forming apparatus and a print control apparatus configured to perform control of the image forming apparatus, wherein:
the image forming apparatus comprises
a first sheet holding unit configured to hold printing sheets,
a second sheet holding unit of a manual feed type configured to hold printing sheets,
a first detection unit configured to detect whether there is a printing sheet in the first sheet holding unit, and
a second detection unit configured to detect whether there is a printing sheet in the second sheet holding unit,
wherein the print control apparatus comprises
a display unit configured to display at least a state of the first sheet holding unit and a state of the second sheet holding unit,
wherein, in a case where it is detected by the first detection unit there are no sheets in the first sheet holding unit, the display unit displays information representing a state of no printing sheet in the first sheet holding unit,
wherein in a case where it is detected by the second detection unit there are no sheets in the second sheet holding unit, the display unit displays information representing a normal state in the second sheet holding unit, and
wherein, in a case where a transition occurs from a state where at least one printing sheet is in the second sheet holding unit to a state where there are no sheets in the second sheet holding unit while the image forming apparatus performs printing using the printing sheets held in the second sheet holding unit, the display unit displays information representing a state of no printing sheet in the second sheet holding unit and the display unit changes the displayed information representing the state of no printing sheet in the second sheet holding unit to information representing a normal state in the second sheet holding unit after a predetermined period has passed.

2. The image forming system according to claim 1, further comprising
a determining unit configured to determine whether the predetermined period has passed,
wherein the display unit changes the displayed information representing the state of no printing sheet about the second sheet holding unit to information representing a normal state about the second sheet holding unit after it is determined by the determining unit that the predetermined period has passed.

3. The image forming system according to claim 1, wherein the information representing the state of no printing sheet is a message that uses characters.

4. The image forming system according to claim 1, wherein the information representing a state of no printing sheet is an icon.

5. The image forming system according to claim 1, wherein the second sheet holding unit of a manual feed type is a manual feed tray.

6. The image forming system according to claim 1, wherein the second sheet holding unit of a manual feed type is an inserter.

7. A control method for an image forming system which includes a first sheet holding unit configured to hold printing sheets, and a second sheet holding unit of a manual feed type configured to hold printing sheets, comprising:
   detecting whether there is a printing sheet in the first sheet holding unit;
   detecting whether there is a printing sheet in the second sheet holding unit and
   displaying at least a state of the first sheet holding unit and a state of the second sheet holding unit,
   wherein in a case where it is detected there are no sheets in the first sheet holding unit, control is performed to display information representing a state of no printing sheet in the first sheet holding unit,
   wherein in a case where it is detected there are no sheets in the second sheet holding unit, control is performed to display information representing a normal state about the second sheet holding unit, and
   wherein in a case where a transition occurs from a state where there is at least one printing sheet in the second sheet holding unit to a state where there are no sheets in the second sheet holding unit while the image forming system performs printing using the printing sheets held in the second sheet holding unit, a display displays information representing a state of no printing sheets in the second sheet holding unit and the display changes the displayed information representing the state of no printing sheet in the second sheet holding unit to information representing a normal state in the second sheet holding unit after a predetermined period has passed.

8. An image forming system comprising:
   a first sheet holding unit configured to hold printing sheets;
   a second sheet holding unit of a manual feed type configured to hold printing sheets;
   a first detection unit configured to detect whether there is a printing sheet in the first sheet holding unit;
   a second detection unit configured to detect whether there is a printing sheet in the second sheet holding unit; and
   a display unit configured to display at least a state of the first sheet holding unit and a state of the second sheet holding unit,
   wherein, in a case where it is detected by the first detection unit there are no sheets in the first sheet holding unit, the display unit displays information representing a state of no printing sheet in the first sheet holding unit,
   wherein in a case where it is detected by the second detection unit there are no sheets in the second sheet holding unit, the display unit displays information representing a normal state in the second sheet holding unit, and
   wherein, in a case where a transition occurs from a state where at least one printing sheet is in the second sheet holding unit to a state where there are no sheets in the second sheet holding unit while the image forming system performs printing using the printing sheets held in the second sheet holding unit, the display unit displays information representing a state of no printing sheet in the second sheet holding unit and the display unit changes the displayed information representing the state of no printing sheet in the second sheet holding unit to information representing a normal state in the second sheet holding unit after a predetermined period has passed.

9. The image forming system according to claim 8, further comprising
   a determining unit configured to determine whether the predetermined period has passed,
   wherein the display unit changes the displayed information representing the state of no printing sheet about the second sheet holding unit to information representing a normal state about the second sheet holding unit after it is determined by the determining unit that the predetermined period has passed.

10. The image forming system according to claim 8, wherein the information representing the state of no printing sheet is a message that uses characters.

11. The image forming system according to claim 8, wherein the information representing a state of no printing sheet is an icon.

12. The image forming system according to claim 8, wherein the second sheet holding unit of a manual feed type is a manual feed tray.

13. The image forming system according to claim 8, wherein the second sheet holding unit of a manual feed type is an inserter.

* * * * *